United States Patent [19]

Lanham et al.

[11] 4,179,235

[45] Dec. 18, 1979

[54] PAN STACK RETRIEVER DOLLY

[75] Inventors: William E. Lanham; William E. Lanham, Jr.; Gene C. Miller, all of Decatur, Ga.

[73] Assignee: Lanham Machinery Company, Inc., Atlanta, Ga.

[21] Appl. No.: 831,481

[22] Filed: Sep. 8, 1977

Related U.S. Application Data

[60] Division of Ser. No. 584,026, Jun. 4, 1974, abandoned, which is a continuation of Ser. No. 325,108, Jan. 19, 1973, Pat. No. 3,937,335, and a continuation-in-part of Ser. No. 243,074, Apr. 11, 1972, abandoned.

[51] Int. Cl.² .............................................. B65G 1/06
[52] U.S. Cl. ..................................... 414/351; 198/347; 414/497; 414/514
[58] Field of Search ...................... 214/16.4 A, 16.4 C, 214/514; 198/347, 364

[56] References Cited

U.S. PATENT DOCUMENTS

| 3,101,851 | 8/1963 | Heide et al. .................. 214/6 H |
| 3,173,557 | 3/1965 | Eliassen ...................... 198/347 X |
| 3,240,365 | 3/1966 | King .......................... 214/16.4 A |
| 3,265,186 | 8/1966 | Burton ........................ 214/16 R |
| 3,526,326 | 9/1970 | Castaldi ...................... 214/16.4 A |
| 3,593,862 | 7/1971 | Pierson et al. ............ 214/16.4 R X |
| 3,719,288 | 3/1973 | Schmitt et al. ............ 214/16.4 C |
| 3,850,316 | 11/1974 | Schmitt ....................... 214/16.4 C |

Primary Examiner—L. J. Paperner
Attorney, Agent, or Firm—Harold L. Stults; Pasquale A. Razzano

[57] ABSTRACT

A pan retriever dolly transfers stacks to a stack conveyor. The dolly includes a retriever arm with a magnet and is mounted for reciprocating movement across the stack conveyor towards and away from the storage conveyor.

4 Claims, 20 Drawing Figures

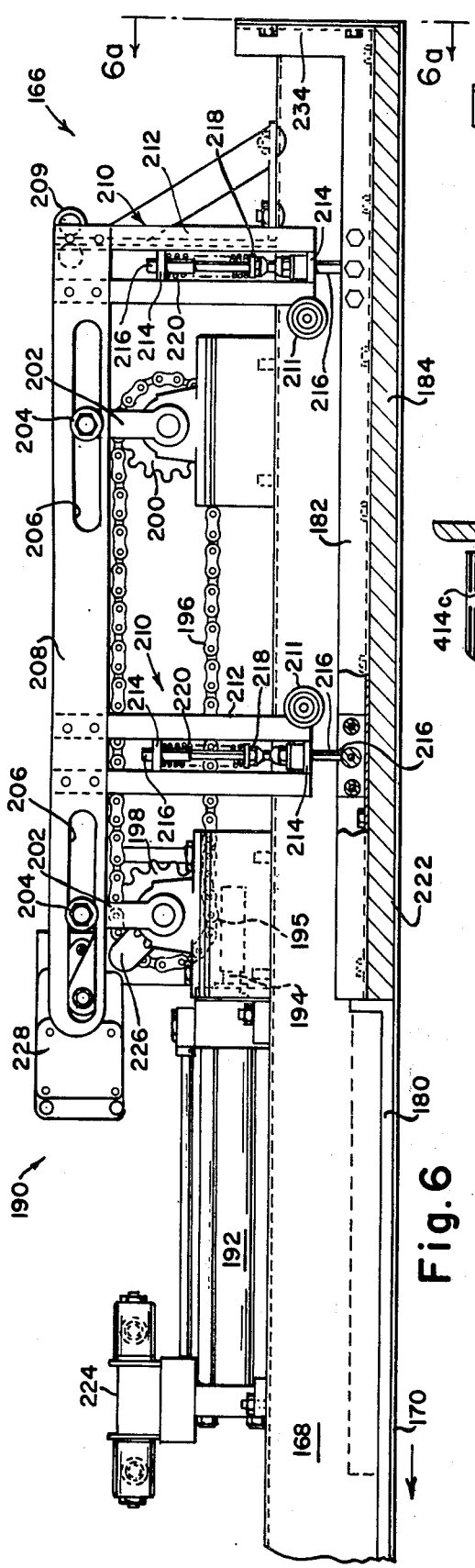
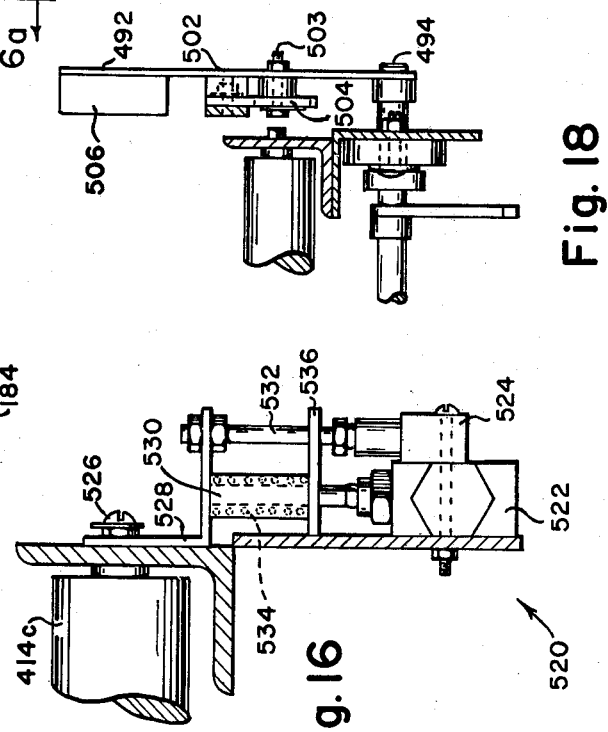
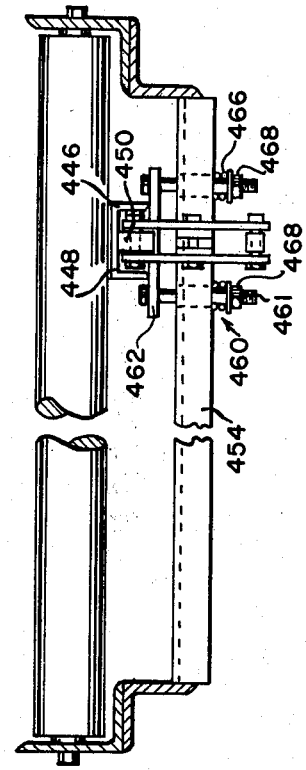
Fig. 6
Fig. 18
Fig. 16
Fig. 15

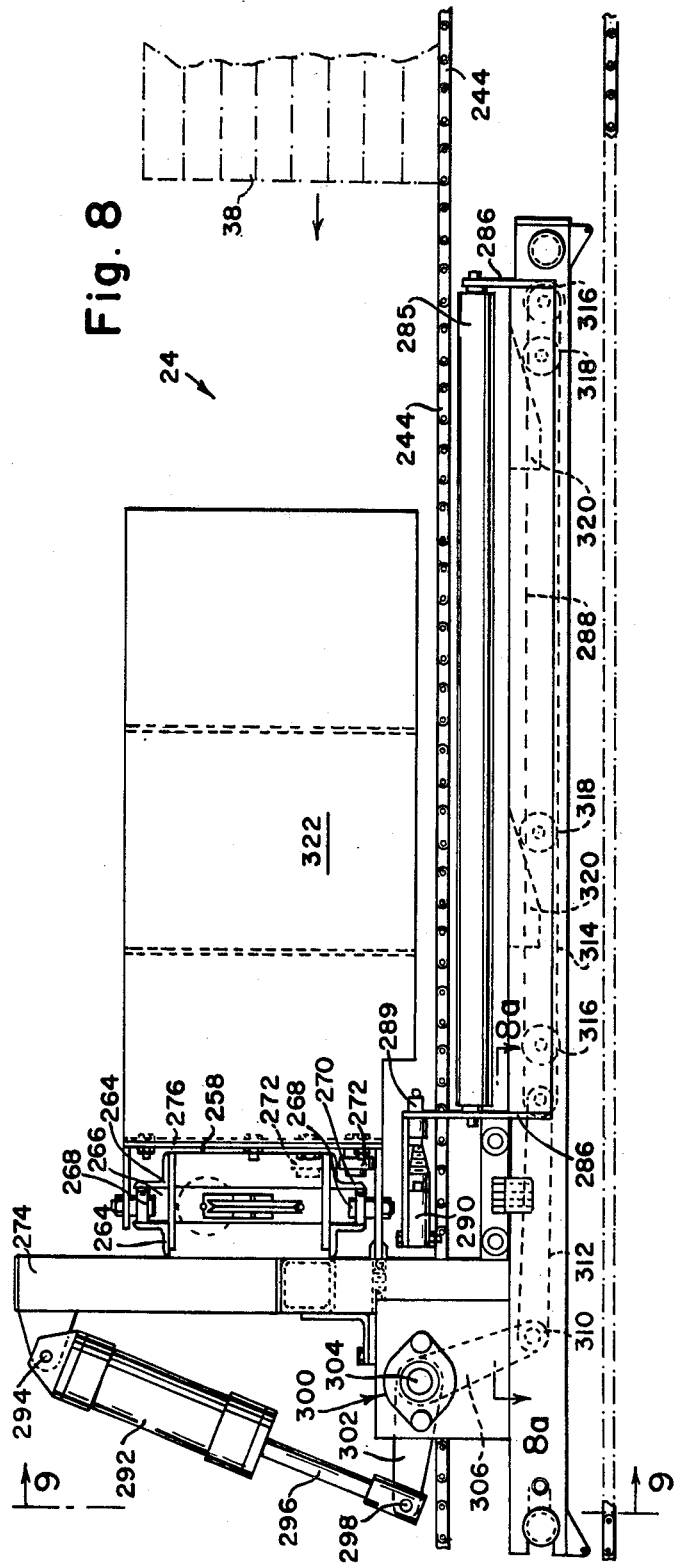
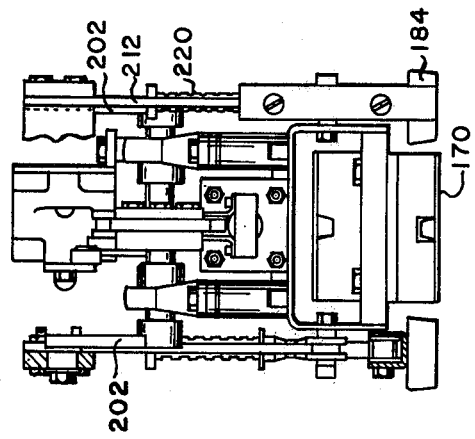

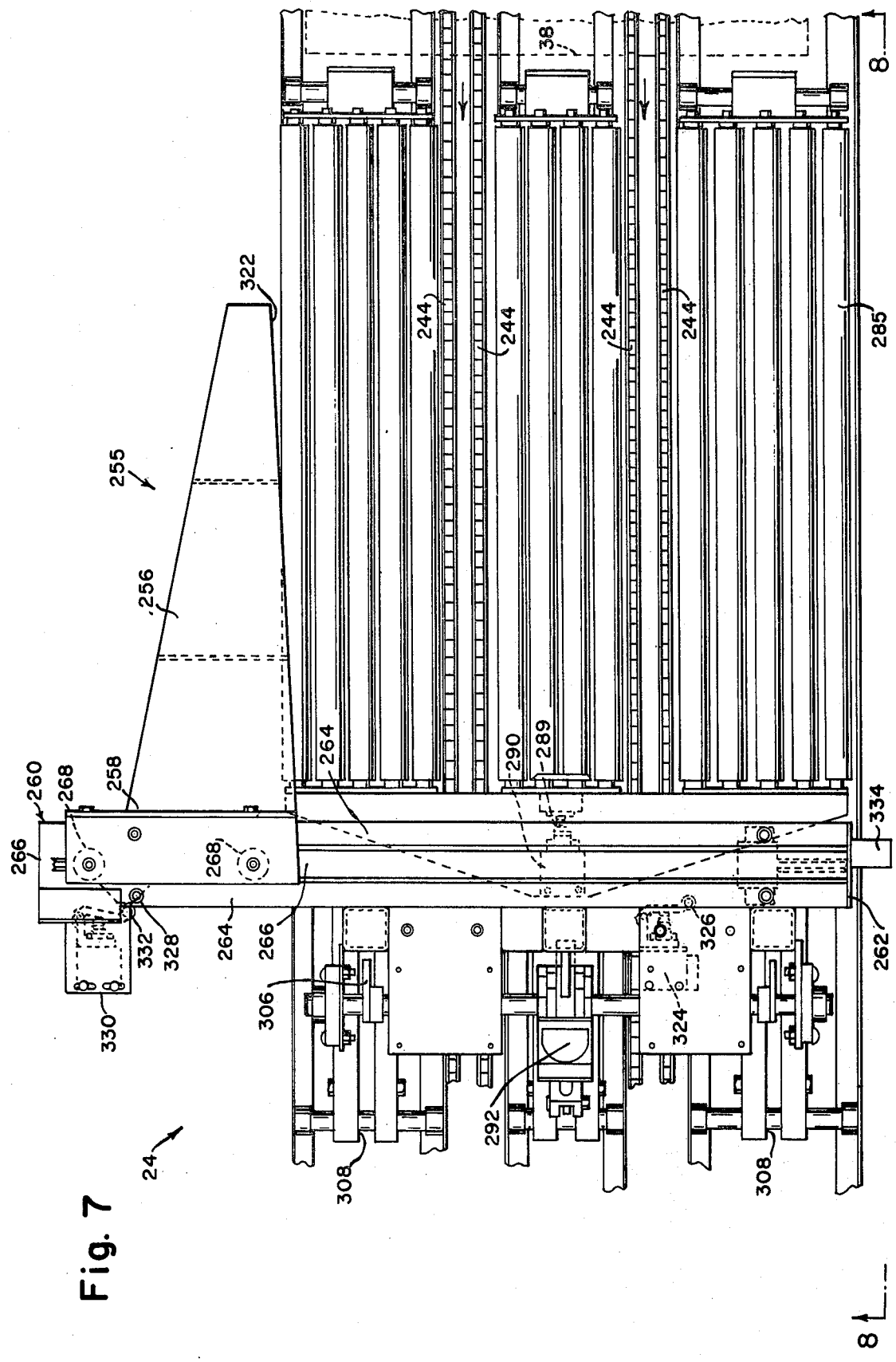

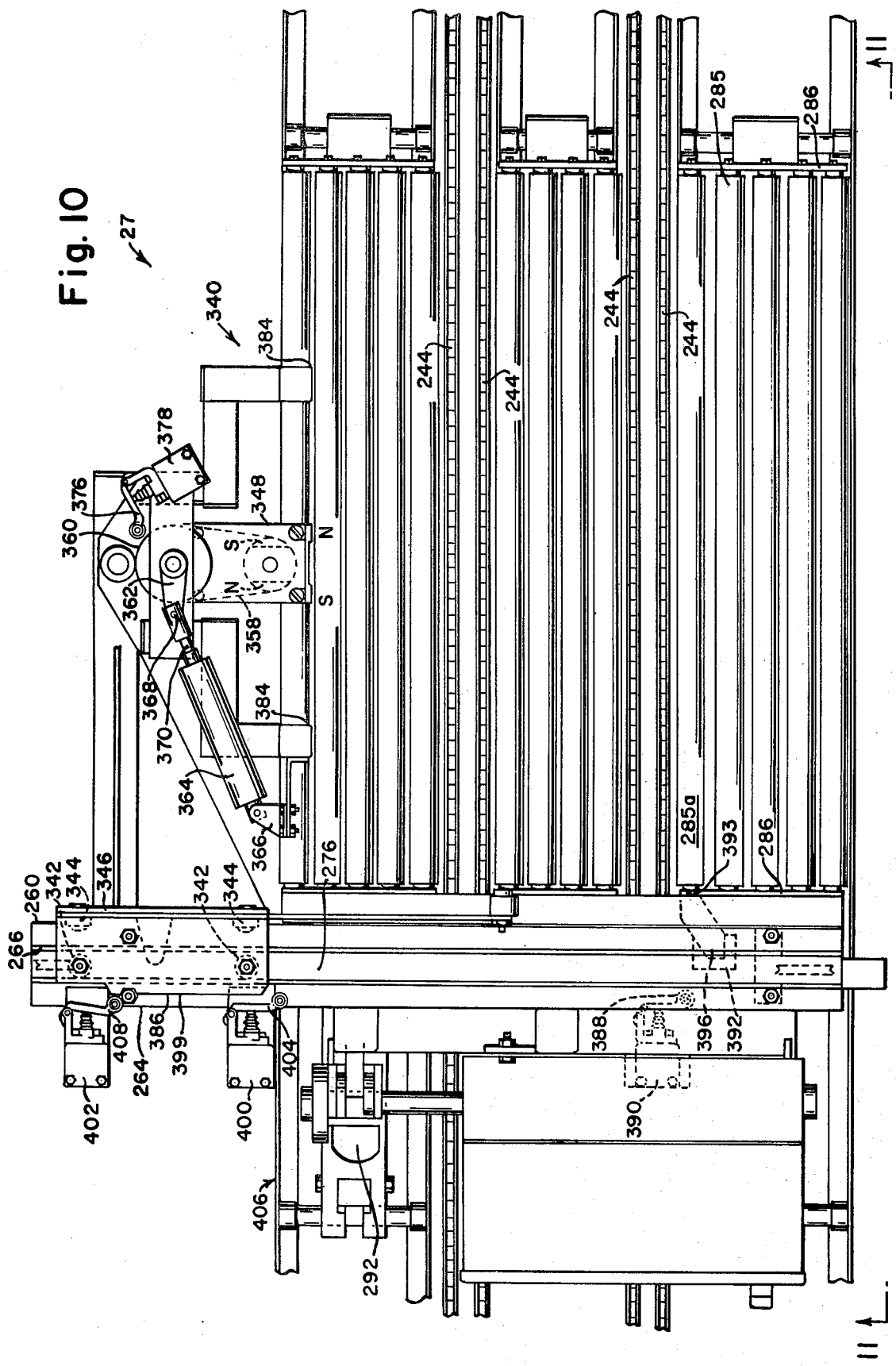

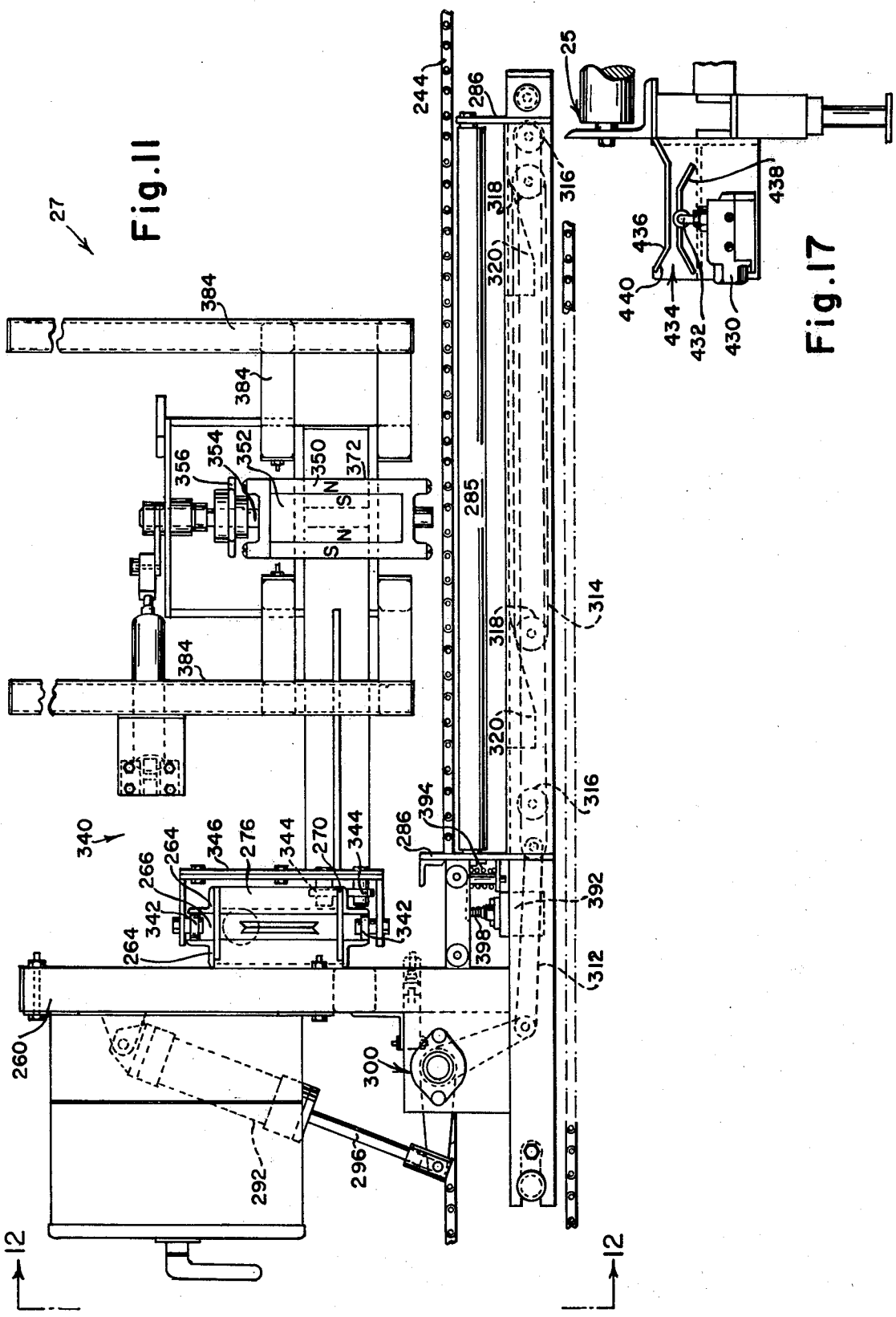

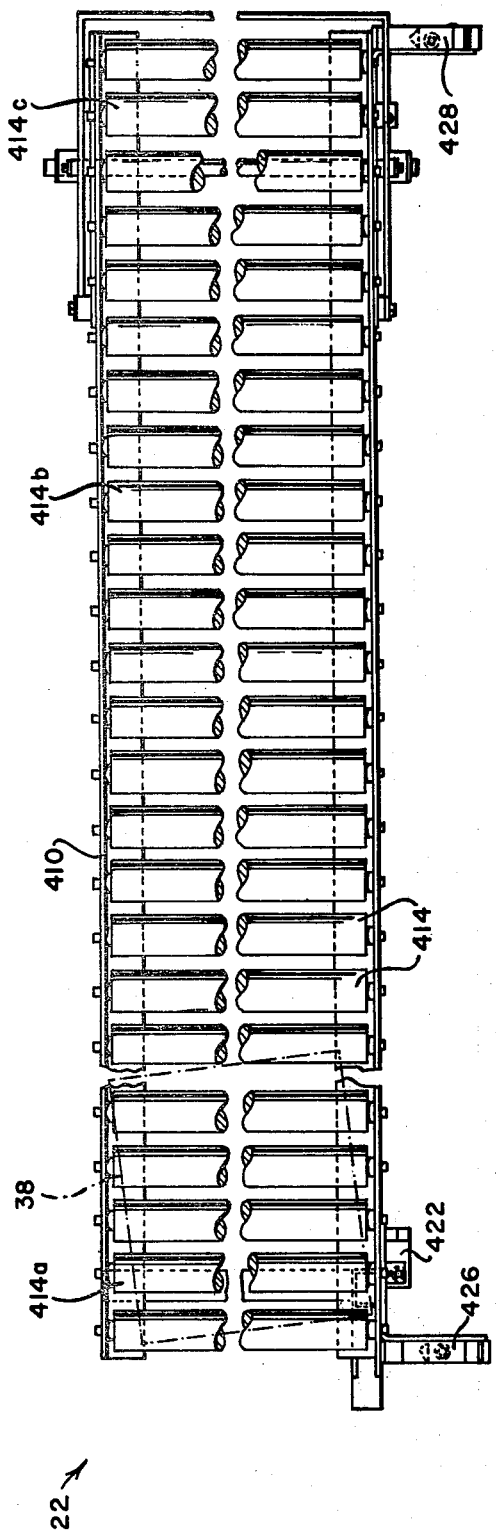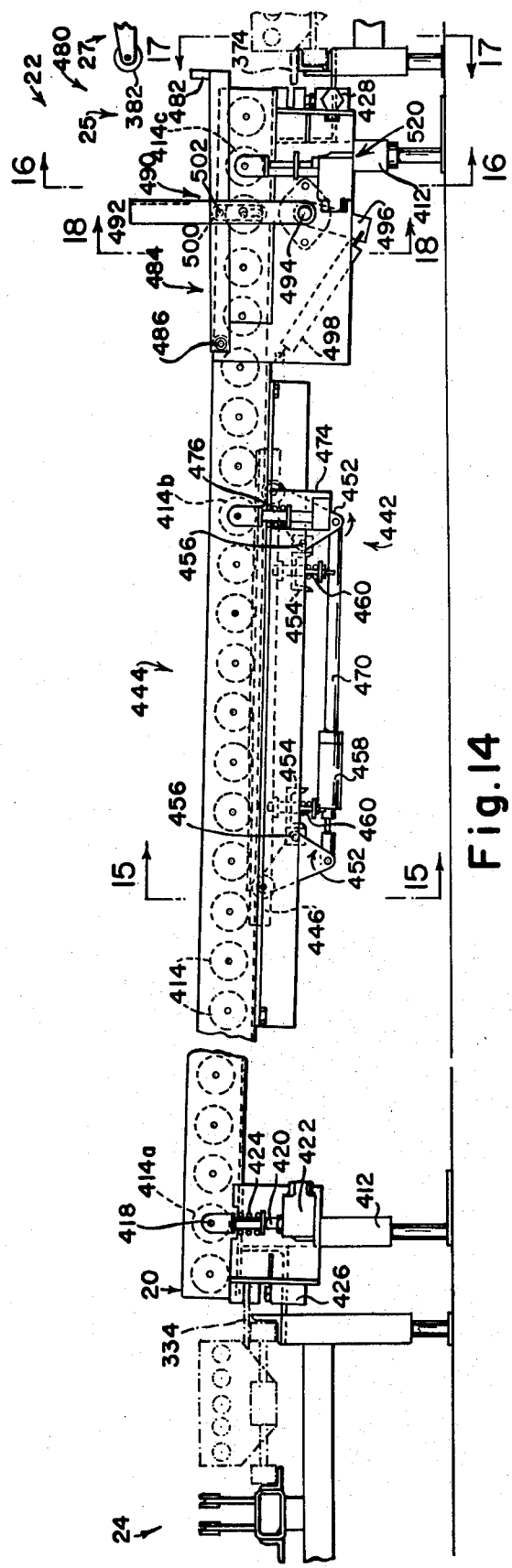
Fig.13
Fig.14

PAN STACK RETRIEVER DOLLY

This application is a division of Ser. No. 584,026, filed June 4, 1974, now abandoned; which is a continuation of Ser. No. 325,108, filed Jan. 19, 1973, now U.S. Pat. No. 3,937,335; which is a continuation-in-part of Ser. No. 243,074, filed Apr. 11, 1972, now abandoned.

The present invention relates to bread pan handling equipment and more particularly to an automatic bread pan system for supplying, retrieving, and storing bread pans used in a baking operation.

The attainment of production goals in a bakery, as expressed in terms of pounds of bread, or for that matter, of pounds of any type of bakery products, per man hour, involves a multiplicity of factors and considerations. First of all, the available equipment must have sufficient capacity to make the desired volume feasible. Manpower must be adequate, both in terms of numbers and in the required skills, and must be available at the proper time and place. Correct scheduling must ensure that the various production units are correctly synchronized so that each is ready to take up operations where the preceeding one has left off and that the right personnel is present and ready for each specific operation. Finally, equipment maintenance must be of a caliber that will prevent disruptive stoppages and breakdowns.

In planning for a given production volume, it is only natural that major emphasis be placed on the principal equipment units, such as mixers, fermentation equipment, make-up units, proofers, ovens, coolers, and packaging machinery, as the individual maximum capacity of each of these various pieces of equipment represents the limiting factor that will determine the final production volume. As a second major consideration, the necessary manpower to operate the plant needs to be carefully planned to make certain that adequate labor is available, yet that overstaffing is avoided since labor costs constitute an important cost factor. Generally, each piece of equipment or operation has a predetermined labor requirement, i.e. the number of operators needed to ensure the efficient functioning of a machine or the performance of a given operation. It is in the less clearly defined area of auxiliary functions, such as supervision, movement of materials within the plan, maintenance and repairs, etc., that labor requirements are more flexible and where important savings in labor can often be effected. One such operation—the handling of bread pans—has until now failed to receive the systematic engineering study and development that have been accorded to the other aspects of bakery operation.

Current methods of break pan management in bakeries still involve a considerable amount of manual handling, even in instances where the depanning is done mechanically. Pans being placed in storage or withdrawn from storage—and this takes place whenever there is either a change in production rate or in product type, and at the end or start-up of a production run—are normally handled manually and are frequently subjected to damaging physical abuse that materially shortens their useful life. The frequency and extent of damage to pans normally show great increases in plants where bread is depanned manually, or where the pans are stacked directly from conveyors by hand or have to be fed to conveyors from stacks.

Although bread pans are designed to withstand a reasonable amount of abuse, the very impression of a sturdiness which a pan strip evokes, also invites rough and careless handling. Moreover, modern high speed production rates, which placed the individuals who either stack pans or feed them into production under too great a pressure, are not very conducive to gentle handling of the pans. In instances where bread pans are stored in a remote section of the plant, it is quite possible for the individual who places the pans into production to overfeed the conveyor leading to the moulder-panner, thereby creating backup pressures on pans which are detrimental to both the pans and to the infeed mechanism of the panner. The cumulative effect of all these factors on the expensive pan inventory may be a premature deterioration of a major capital investment that will have serious repercussions on the bakery's over-all profit picture.

Many of these problems are solved by the present invention in which the manual handling of pans throughout the pan feeding and storing cycle is eliminated by an apparatus and process which brings about as gentle a transfer of pans from storage to production and vice versa, as possible. This is accomplished by a pan handling, feed and stacking system which is almost completely automatic in operation and which is sufficiently flexible so that it will accommodate four, five and six-pan straps. Given suitable proofer and oven capacities, the use of six-pan straps will enable the baker to increase his production potential considerably without a corresponding increase in conveyor and oven transport speeds. Basically, the present invention is adapted to automatically remove pans from a return conveyor, stack them and place them into storage. In the reverse cycle, upon demand, the apparatus is adapted to select pan stacks from storage, unstack the pans and then introduce them into production.

Accordingly, it is an object of the present invention to automatically introduce, stack, remove, unstack and store pans in a baking process.

Another object of the invention is to automatically introduce, remove and store pans in a baking process by a method and apparatus which is relatively inexpensive and durable in construction and operation.

The above, and other objects, features and advantages of this invention, will be apparent in the following detailed description of an illustrative embodiment thereof which is to be read in connection with the accompanying drawings, wherein:

FIG. 6 is an enlarged elevational view of the unstacker pickup head assembly mounted at the top of the unstacker shown in FIG. 5;

FIG. 6a is an enlarged end view, with parts broken away, and taken along line 6a—6a of FIG. 6, of the unstacker pickup head assembly;

FIG. 7 is an enlarged plan view of the pan stack storage dolly shown schematically in FIG. 1;

FIG. 8 is an elevational view taken along line 8—8 of FIG. 7 of the storage dolly;

FIG. 8a is a partial plan view taken along line 8a—8a in FIG. 8;

FIG. 10 is a plan view, similar to FIG. 7, of the pan stack retriever dolly, shown schematically in FIG. 1;

FIG. 11 is a front elevational view, taken along line 11—11 in FIG. 10, of the retriever dolly;

FIG. 13 is a plan view of one of the pan stack storage conveyors used in the pan handling system of FIG. 1;

FIG. 14 is a side elevational view of the pan stack storage conveyor shown in FIG. 13;

FIG. 15 is a sectional view taken along line 15—15 of FIG. 14;

FIG. 16 is a partial sectional view, taken along line 16—16 of FIG. 14;

FIG. 17 is a partial end view taken along line 17—17 of FIG. 14; and

FIG. 18 is a partial sectional view taken along line 18—18 of FIG. 14.

Figure 1:
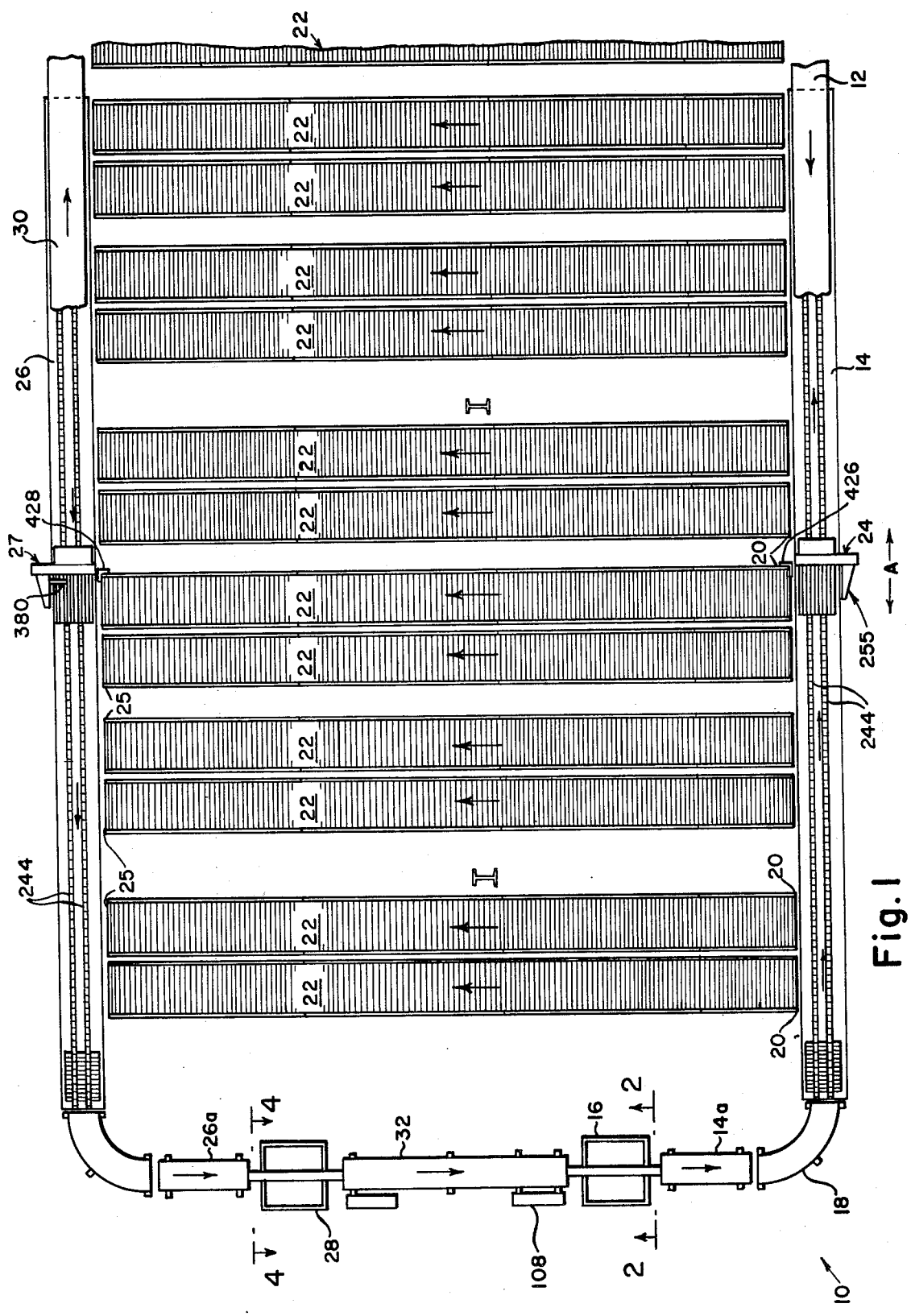
FIG. 1 is a schematic plan view of an automatic bread pan handling system constructed in accordance with one embodiment of the present invention.

Referring now to the drawing in detail and initially to FIG. 1 thereof, it will be seen that an automatic bread pan handling apparatus 10, as shown therein, includes an input conveyor 12 on which individual pans are supplied to the pan handling apparatus from the end of a bread baking process. Typically, the pans are supplied from the bread depanner apparatus when the baking process is shut down, during the baking process itself when the number of pans needed for baking is reduced, or when the size of the pans used or the type of bread being baked is to be changed.

Conveyor 12 is preferably an endless conveyor of conventional construction, located about the periphery of pan handling apparatus 10, and supported in an elevated position above a lower storage conveyor 14, more fully described hereinafter. Individual pans moving along conveyor 12 (in the direction of the arrows) from the depanner are supplied around the curve 18, to the top of a stacker unit 16 located at the left end of the pan handling apparatus, as seen in FIG. 1.

Stacker unit 16, as described more fully hereinafter, receives individual bread pans from conveyor 12 and places a predetermined number of the pans in a vertical stack. After the desired number of pans are placed in a stack by stacker 16, the stack is moved onto conveyor 14, at its first section 14a, below infeed conveyor 12. Conveyor 14 moves the stack into a selected position adjacent the end 20 of one of a series of gravity-type storage roller conveyors 22.

A storage dolly assembly 24, mounted for sliding movement along and in cooperation with conveyor 14, is selectively positioned adjacent the end 20 of any one of the gravity roller conveyors 22 so as to stop movement of the stack of pans on conveyor 14 at the end of the selected gravity roller conveyor. Preferably, a control system is provided which will determine whether a selected gravity roller conveyor 22 is already filled with stacks of pans and will thus cause the dolly 24 to be moved to the next empty gravity roller conveyor. After stopping the stack of pans on conveyor 14, storage dolly 24 pushes the stack, as more fully described hereinafter, onto the end 20 of the selected storage conveyor.

The ends 20 of storage conveyors 22 are at a higher elevation than the opposite ends 25 thereof. Accordingly, a stack of pans placed on a conveyor 22 will roll down the conveyor, in the direction of the arrows used in FIG. 1, towards the opposite side of the apparatus. Brake means are provided along the conveyors 22 in order to slow the movement of the stacks along the gravity rollers towrds the end 24 thereof. In addition a selectively releasable stop assembly is provided at the end 25 of each conveyor 22 to selectively prevent discharge of pan stacks from the conveyor.

A lower conveyor 26 is located adjacent the ends 24 of gravity roller conveyors 22. Conveyor 26 cooperates with a pan stack retriever dolly 27 which is similar to dolly 24 and is controlled so as to be selectively moved into position adjacent the end of any one of the storage conveyors 22. At the beginning of the baking operation, or as more pans are required during the course of the baking operation, retriever dolly 27 can be moved into alignment with the end 25 of a selected gravity roller conveyor 22 and thence can be operated to remove a stack of pans from the selected storage conveyor. The structure for the retriever dolly is described more fully hereinafter.

The retriever dolly is adapted to engage the lowermost pan in the stack with lower conveyor 26 so that the stack is then moved along conveyor 26 to an unstacker unit 28. This unstacker, as described hereinafter, is adapted to sequentially removed individual pans from a stack of pans contained therein and place the same on an upper conveyor 30, corresponding to conveyor 12, located above conveyor 26. As the individual pans from the unstacker are removed and replaced on conveyor 30, they are transported by the conveyor to the bread manufacturing equipment or process; typically the pans are moved to the conventional pan moulder at the beginning of the bread making process.

It is noted that in the drawings only the right hand portions of conveyors 12 and 30 are shown for clarity. However, it is to be understood that those conveyors extend along and above their corresponding lower conveyors 14 and 26 to positions adjacent the stacker and unstacker units.

In the embodiment of the invention shown in FIG. 1 of the drawings, an intermediate conveyor 32 is provided in alignment with lower conveyor sections 14a and 26a, between the lower end portions of stacker 16 and unstacker 28. The stacker and unstacker of the present invention are constructed to cooperate with conveyor 32 so that a partially unstacked stack in unstacker 28 can be transported through the unstacker, along conveyor 32, and thence through the stacker onto conveyor 14 for return to one of the storge roller conveyors 22. In addition, an upper conveyor (not shown in FIG. 1) superimposed above conveyor 32 is provided for moving individual pans in a direction opposite to the direction of movement of the stacks on conveyor 32. By this construction, individual pans moving along conveyor 12 can be passed directly through stacker 16, along the upper conveyor, and thence through the top of unstacker 28 onto conveyor 30 for return to the bread manufacturing process.

It is to be understood that the pan handling system illustrated in FIG. 1 is but one illustrative embodiment of the various arrangements or layouts which can be used in connection with the various components of the invention. In this regard it is noted, for example, that the pans in the embodiment shown in FIG. 1 move through the stacker and unstacker in a C-shaped path of travel, i.e. the pans move along the conveyor 12 into the top of the stacker, then move downwardly in the stacker as the stacker is formed, and then out along lower conveyor 14 below conveyor 12. However, the components of the stacker and the unstacker are constructed so as to provide greater flexibility in design, i.e. both the stacker and unstacker of the present system can be operated in the manner shown in our copending patent application mentioned above. As shown therein, individual pans enter the top of the stacker, move downwardly therein as they are stacked, and then move out along a lower conveyor on the opposite side of the stacker, so that the pans move in a generally Z-shaped pattern through the stacker. The unstacker can also be operated to pass pans therethrough in a C or Z-shaped path of travel, without any physical modification thereof. In this manner, the stacker and unstacker add flexibility to the system and a variety of layout designs for the pan handling system in order to accommodate various sized and shaped facilities.

The various components of the pan handling system of the present invention are described hereinafter in detail in individually titled subsections.

STACKER

Figure 2:
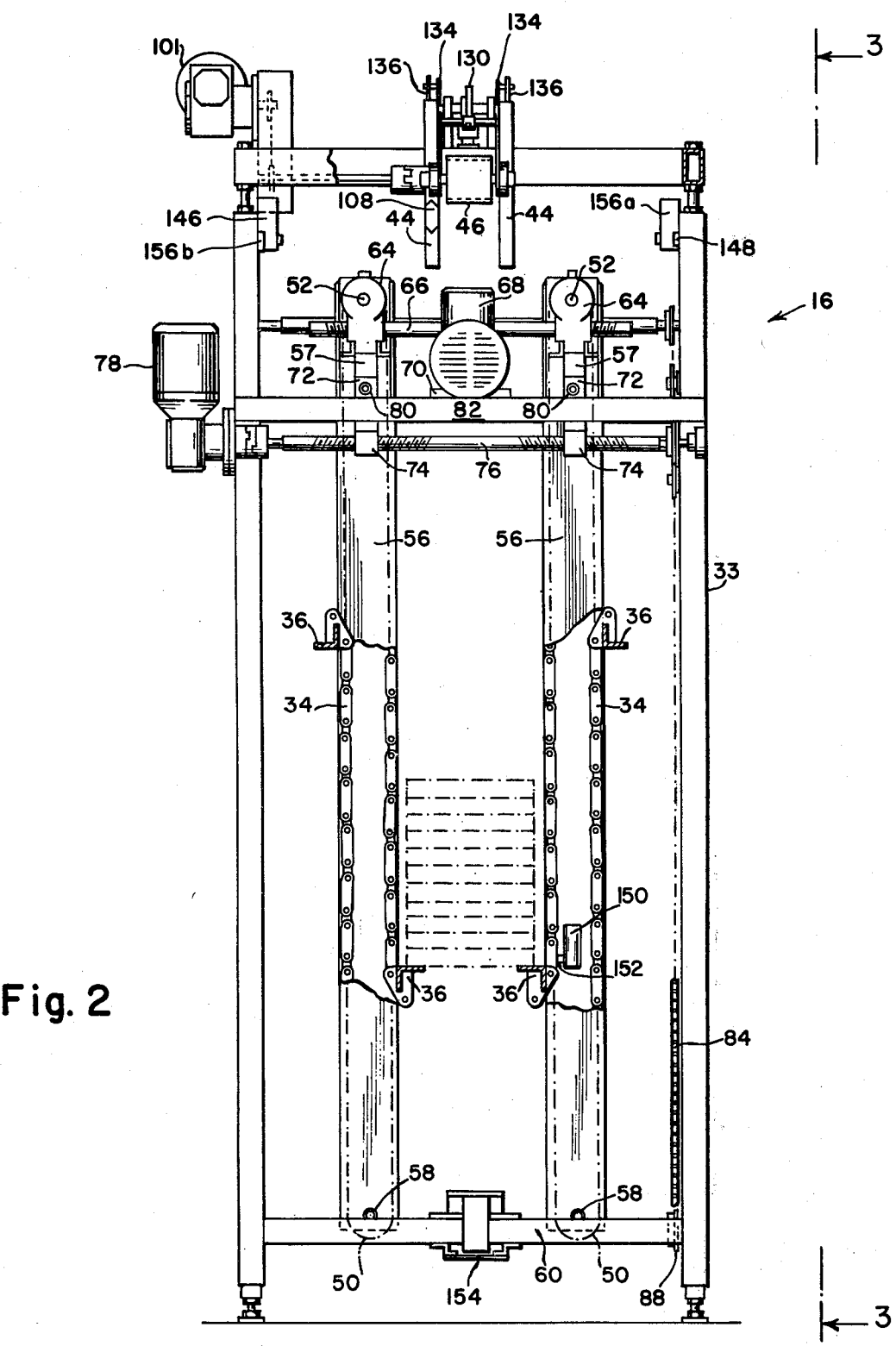
FIG. 2 is an end view, with parts broken away, of the bread pan stacker mechanism utilized in the bread pan handling system shown in FIG. 1 and taken in the direction of the arrows 2—2 therein.
Figure 3:
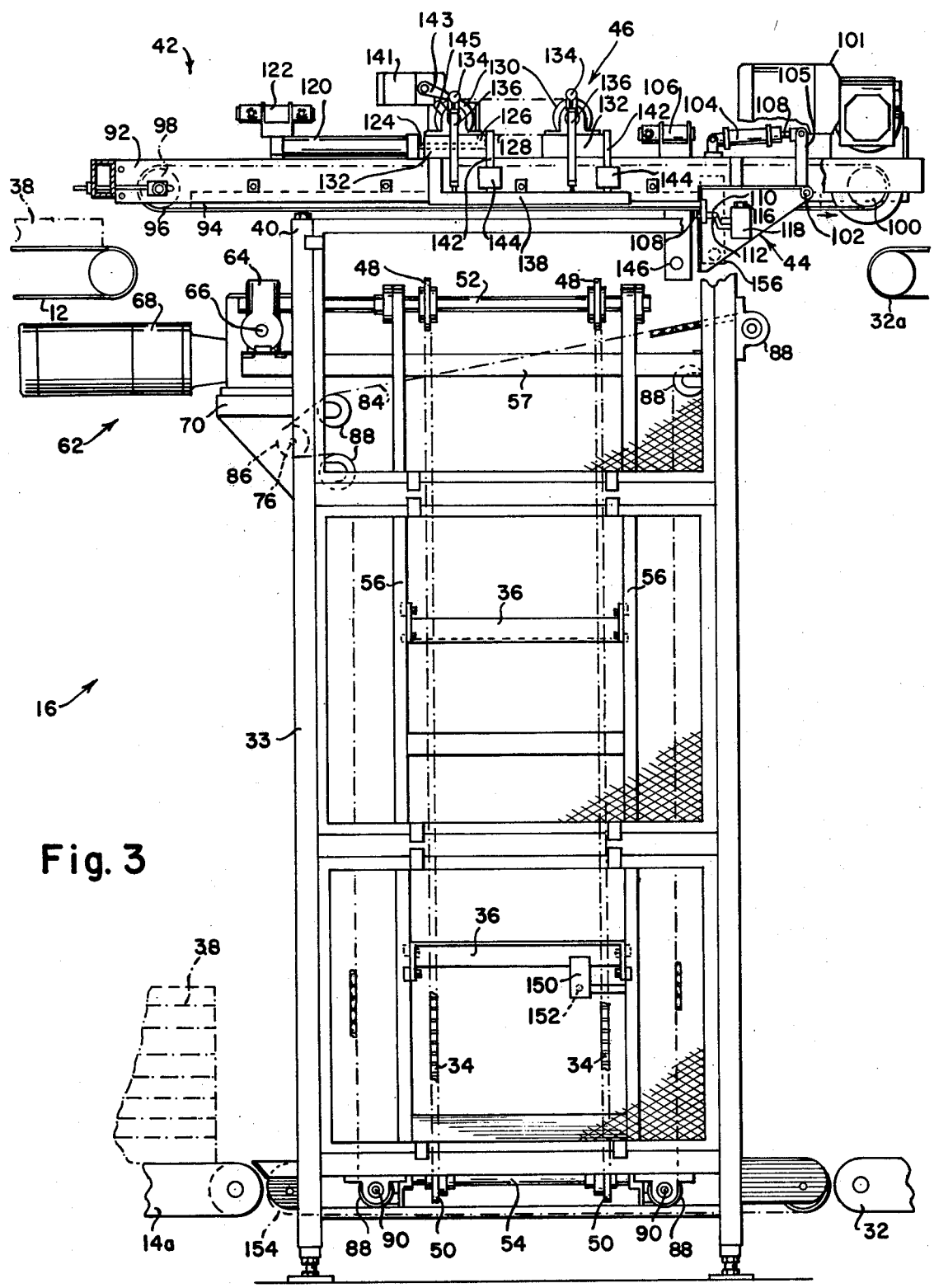
FIG. 3 is a side view, along line 3—3, of the bread pan stacker shown in FIG. 2.
Figure 4:
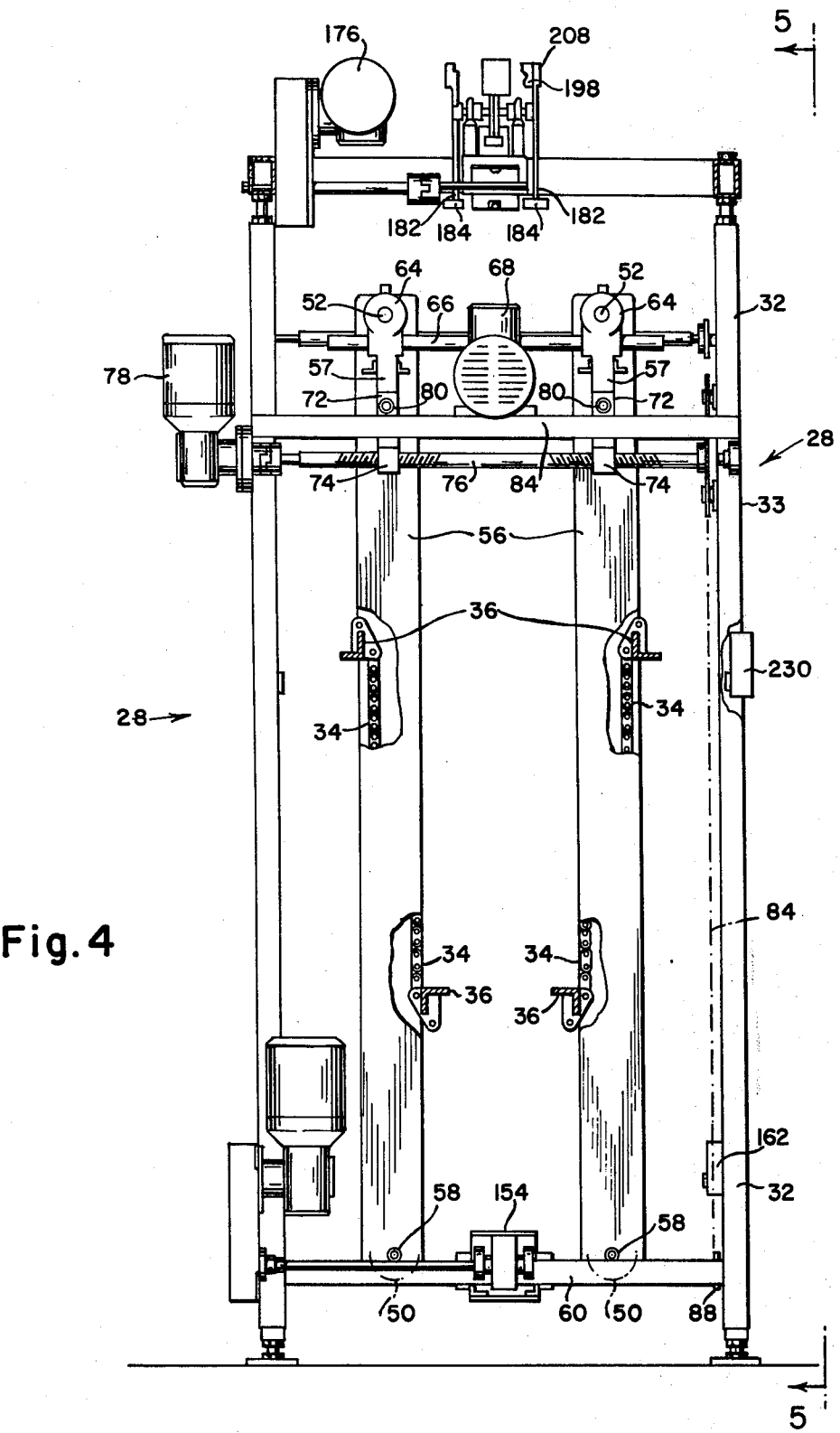
FIG. 4 is an end view, taken along line 4—4 of FIG. 1, of a pan unstacker utilized in connection with the present invention.

The pan stacker unit 16 is illustrated in detail in FIGS. 2 and 3 of the drawing, and includes a relatively rigid rectangular support frame 33 upon which the various components of the stacker are mounted. Two pairs of vertical, parallely extending endless chains 34 are mounted adjacent opposite sides of the frame 33 and have at least two pairs of horizontally extending support lugs 36, mounted therebetween for supporting a stack of pans during the stacking process. These stacks are formed from the individual bread pans 38 (indicated in dotted lines in FIG. 3) supplied from conveyor 12, adjacent the upper portion 40 of frame 33. The individual pans are moved by conveyor 12 into engagement with a magnetic conveyor assembly 42 mounted at the top of frame 33. The assembly 42 holds the pan 38 at the top 40 of frame 33 and moves it into position above and between supporting chains 34. When the pan is in the proper position above chains 34 and lugs 36, as defined by a movable stop member 44, a pusher mechanism 46 is actuated to disengage the pan from magnetic conveyor assembly 42 and drop the same onto a pair of opposed lugs 36 positioned therebelow, or onto the top of a stack of pans already partially formed in the stacker and supported on lugs 36.

Stacker 16 is adapted to accommodate a variety of sizes of bread pan straps or the like so as to provide increased flexibility for the bread manufacturer in so far as the number of types of bread pans he can store and use in his bread manufacturing process. Accordingly, lug support chains 34 are mounted so as to be movable laterally with respect to each other, in the manner shown in FIG. 2, in order to accommodate various widths of pan straps. To accomplish this, chains 34 are operatively engaged with sprockets 48, 50 respectively secured to shafts 52 and 54 at the upper and lower ends of frame 33. Both of these shafts are rotatably mounted in spaced pairs of frame members 56, the latter being supported at their lower ends on rollers 58 which ride on a transverse frame member 60 of frame 33. In this manner the weight of the chains 34 and any pans or stack supported therein are borne directly by frame 33 and not by the drive mechanism for the chains.

Shaft 52 comprises the drive shaft for chains 34 and is adapted to be rotated by a drive system 62. This drive includes a pair of individual right angle drive members 64, of conventional construction, connected respectively to each of the drive shafts 52 and mounted respectively on rigid cross-frame members 57 secured between vertical frames 56 and extending beyond those frames in opposite directions. Right angle drive members 64 are connected through a cross-shaft 66 to a hydraulic drive motor 68 or the like. The latter is mounted on a support plate 70 secured to frame 33.

In order to vary the width or spacing between chains 34, each of the horizontal frame members 57, extending between frames 56 is provided with a depending rigid frame member 72 (below right angle drives 64) threadedly engaged at 74 with an elongated laterally extending shaft 76 having two oppositely directed gear sections formed thereon. Shaft 76 is selectively driven by a hydraulic motor 78 which may be manually controlled as desired, in order to move frames 56 and thus right angle drives 64 in opposite directions, thereby to vary the spacing between chains 34 and lugs 36. In this connection, it is noted that frame member 72 also has rollers 80 mounted thereon and supported on cross-frame member 82 of frame 32 to additionally support the weight of the chains 34 and any stack supported thereon.

It is noted that drive motor 78 is only directly connected to the left hand frame members 56 (as viewed in FIG. 3) through shaft 76. In order to insure synchronous movement of both frame members 56 on opposite ends of shaft 52, an auxiliary drive or timing arrangement is provided which includes a drive chain 84 trained over a sprocket 86 secured to shaft 76 and a plurality of guide sprockets 88 mounted along the frame 33. The lowermost sprockets 88 are secured to lateral adjustment shafts 90, which are formed in a manner similar to shaft 76, i.e. they have two oppositely threaded portions formed thereon respectively threadedly engaged with the lower ends of supports 56. In this manner, rotation of shaft 76 by motor 78 is imparted to the shafts 90, so that the upper and lower ends of chains 34 move in synchronism when the spacing therebetween is to be varied.

At the initiation of operation of the stacker utilized in the present invention, one of the sets of lugs 36 are located adjacent the upper end of the path of travel of chains 34 to receive the first pan 38 supplied to the unstacker. This may be done by manually controlling the operation of motor 68. As mentioned above, pans 38 are transported from conveyor 12 to a position over lugs 36 by the magnetic conveyor assembly 42. That assembly includes a frame 92 in which a relatively large elongated and powerful magnet 94 is securely mounted. An endless conveyor 96 is also mounted in frame 92, about a pair of opposed end rollers 98, 100, around magnet 94 so that the magnetic field created by the magnet extends through the conveyor. Roller 100 is driven by a hydraulic motor 101 or the like, mounted on frame 92 and moves the lower flight of conveyor 96 to the right, as seen in FIG. 3. In this manner, as a pan 38 moves off the end of conveyor 12, it is attracted and held against conveyor 96 by the magnetic field of magnet 94. Moreover, the engagement between conveyor 96 and pan 38 causes the pan to move along magnet 94, toward the right in FIG. 3, under the pusher mechanism 46.

Morement of pan 38 in this manner is limited by a stop member 44 which is pivotally mounted on frame 92 at pivot point 102. As seen in FIG. 2, there are actually two stop plates 44 mounted on the common rock shaft 102 and located on either side of conveyor 96. When it is desired to permit the individual pans 38 to pass through the stacker without stacking, so as to proceed to and through unstacker 28, along the conveyor 32a located above conveyor 32, to conveyor 30 for return to the bread manufacturing process, the abutment members 44 are pivoted out of the path of travel of pans 38 by a ram 104 mounted on frame 92 and connected through its actuator rod 108 to a crank arm 105 rigidly secured to shaft 102. Ram 104 is controlled by a pilot air valve 106 which in turn can be manually operated or controlled from a main control panel 108, in any convenient manner, as would be apparent to those skilled in the art. Alternative pilot valve 106 may be automatically controlled by a portion of the baking process, i.e. the pannermoulder, which will provide a pneumatic signal to valve 106 when additional pans are required so as to permit individual pans to be recycled without stacking. This signal can be produced by a conventional detection device, well known in the art. The specific pneumatic circuitry used to control valve 106 is not part of the present invention and, in any case, would be apparent to one skilled in the art.

In any case, actuation of pilot 106 causes air to be supplied to the pneumatic cylinder 104 to extend the actuator rod 108 thereof towards the right, thereby causing clockwise pivotal movement of abutments 44 about rock shaft 102 to permit free passage of pans 38 along the remainder of conveyor 96. As the individual pans approach the end of conveyor 96, and as the conveyor moves around roller 100, the pan is automatically discharged onto conveyor 32a, located between stacker 16 and the unstacker 28. The pan then proceeds through the unstacker 28, as described hereinafter, onto conveyor 30, which returns the pan to the bread manufacturing process.

As a safety control, a photocell and reflector assembly 156 is provided adjacent the top of frame 33 to override the pivotal movement of abutment 44. This photocell assembly includes a main unit 156a mounted on one side of frame 33 and having a light source and photosensitive element therein; and a reflector 156b mounted on the other side of frame 33. The photocell assembly is thus adapted to determine whether the abutment 44 can be pivoted into its lower most position without interference by any pan supported on conveyor 96. Thus, if a pan is present on conveyor 96, it is seen by the photocell, i.e. the pan interrupts the light beam traveling between the light source and its reflector; as a result, the photocell produces a signal to override pilot valve 106 and prevent abutment member 44 from being swung down while the pan is in the way. If no pan is present, the light beam is uninterrupted and the abutment member 44 can pivot freely down into the position illustrated in FIG. 3.

When it is desired to stack pans 38 pilot valve 106 is operated so that ram 104 contracts and moves abutment 44 into the position shown in FIG. 3. Thus a pan 38, carried on conveyor 96 under the influence of magnetic conveyor 94, will move to the right with the conveyor until it is engaged against the abutment members 44. One of the abutment members 44 has an abutment portion 108 which is slidably mounted in the abutment member and engages the end 110 of the pivotally mounted lever 112. The latter is positioned to engage the stem 116 of a control or air limit valve 118 mounted on the abutment member. This valve is used to control the supply of air, through a pilot valve 122, to a ram 120 mounted on frame 92. Ram 120 has an actuator rod 124 which is connected at its free end 126 to an endless chain 128. The latter is rotatably mounted about a pair of sprockets 130 which in turn are rotatably mounted on supports 132 seated on frame 92. Sprockets 130 have crank arms 134 rigidly secured to the axes of rotation of the sprockets so that the crank arms rotate therewith.

The connection 126 between actuator rod 124 and chain 128 is such that upon one full stroke of the acutator rod in either direction chain 138 will be moved through a distance sufficient to rotate sprockets 30 through one complete revolution, i.e. through 360°, for reasons more fully described hereinafter.

A pair of rigid support links 136 are pivotally mounted at their upper ends cranks 134 and are rigidly secured at their opposite ends to a pusher bar 138. In this connection it is noted that there are crank arms 134 located on opposite sides of each of the sprockets 130 and complementary arms 136 connected thereto on each side of frame 92, each being attached to independent pusher bars 138. (Note FIG. 2). In addition, the vertical movement of pusher bars 138 is guided by the provision of guide rods 142 which are adapted to slide in guide tracks 144 secured to frame 92.

By this construction of the pusher assembly 46, when a pan becomes engaged with the member 108, to cause actuation of valve 18, air is supplied through pilot valve 122 to extend ram 120, from the position illustrated in FIG. 3 of the drawing, to its fully extended position towards the right. As the actuator rod moves towards the right cranks 130 are rotated through 360° so that pusher members 138 first are moved downwardly by links 136 into engagement with the pan 38 therebelow on conveyor 9, thereby pushing the pan away from the conveyor and magnet 94 and causing the same to drop downwardly a short distance onto the support lugs 36. As the actuator rod 124 continues to move to the right (towards the end of its stroke), push members 138 are raised back to the position thereof illustrated in FIG. 3 as the sprockets move through the completion of their one revolution. In this position, push mechanism 46 is ready to disengage the next pan supplied along belt 96 to the unstacker.

It is noted that by the construction of the present invention the actuator rod 124 remains in its extended position until the next pan 38 engages actuator member 108 to again supply air to ram 120. This next supply of air is used to retract the actuator rod 124; in order to do this, the position of pilot valve 122 must be reversed. Accordingly, pilot valve 122 is controlled by a two position microswitch 141 which includes a pivotally mounted switch actuator lever 143. The free end of lever 141 is located in position to be engaged by an actuator stub or tab 145 secured to one of the sprocket gears 130. As seen in FIG. 3 of the drawing, when sprocket gear 130 is rotated in a counterclockwise direction, upon extension of actuator rod 124, tab 145 rotates therewith, and as it approaches the completion of its single revolution, will engage lever 143 and rotate it in a clockwise direction to one of its two positions. The control switch 141 is constructed to reverse the feed of the pilot valve 122 when it is moved from one position to another, as is well understood by those skilled in the art, so that upon the completion of a stroke by ram 120, the supply of air to the ram is automatically reversed in anticipation of the next supply of air to the ram which will then move the ram in the opposite direction. When that is done, i.e. when sprocket 130 moves in a clockwise direction to return tab 145 to the position illustrated in FIG. 3, the tab again engages lever 143 and rotates it in a counterclockwise direction to place the switch in its second position, again reversing pilot valve 122 so that when air is again supplied to the ram in the next operation the ram will be extended. Of course, it is understood that when a pan is removed from conveyor 96 by pusher mechanism 46, the actuator 108 of valve 118 is relieved so that air to pilot 122 is shut off and ram 120 cannot operate in the reverse direction until the next pan enters the stacker.

When a pan 38 is placed on the lugs 36 in the manner described above, the chains 34 are operated to lower the lugs and the pan thereon to permit the next pan 38 to either pass through the stacker or to be placed on the stack in its sequence. This is accomplished by the provision of a photocell arrangement 146 (see FIG. 2) of conventional construction which is mounted adjacent the top of frame 32. The photocell arragement includes a light source which projects a light beam across the top of frame 33, adjacent the top of conveyors 34, to a reflector 148. Thus, if no pan is present or supported at the top of conveyors 34, on the lugs 36, the light beam from the light source in photocell 146 will be reflected by reflector 148 to the photosensitive element in member 146. However, when a pan 38 is seated on support lugs 36 at the uppermost position thereof, the light beam from source 146 will be interrupted, indicating that the space at the top of the frame is occupied and another pan cannot be moved onto the lugs or stack.

Photocell assembly 146 is used to control the motor 68 which drives chains 34 and to override the control for the supply of air to ram 120. Thus, when a pan is located on lugs 36 at the top of the frames 56, interrupting light beam 146, the photocell assembly produces a signal which is used to operate motor 68 and drive chains 34 to lower support lugs 36 until the beam from the photocell 146 is again uninterrupted. At that point the drive to motor 68 is stopped and another pan can be placed on the stack. Simultaneously, as long as the beam 146 is interrupted, the supply of air to ram 120 is prevented, irrespective of the condition of valve 118, so that pusher bars 138 will not be operated to push pans supported on the conveyor 96 down to the lugs or stack.

After the first pan placed on the lugs is lowered in this manner, the next pan can be dropped thereon by pushing mechanism 46 and the operation or cycle continues until a stack of desired height is obtained and is supported on the lugs 36. This is determined by the provision of a microswitch 150 supported on frame 33, in any convenient manner, at a desired level below the top of the frame. This switch has a contact 152 adapted to be engaged by the pans or by the support lugs as they move downwardly in the stacker. When the microswitch 150 is activated in this manner, it produces a signal which is used to operate motor 68 and cause it to lower the stack to its lowermost position in frame 33, while simultaneously preventing air from being supplied to ram 120, irrespective of the condition of valve 118. Of course, manual controls can be provided in panel 108 to override all of these operations to permit the operator to move even just a partially completed stack to the bottom of the stacker.

An endless conveyor 154 is rotatably mounted at the lower portion of frame 33, in alignment with conveyors 32 and 14a. As the stack of pans 38 is moved downwardly by the chains 34 in the manner just described, the lowermost pan becomes engaged with the conveyor 154. As the chains 34 continue to rotate, the lowermost pan is disengaged from the lugs 36 and the pans are supported and moved by the conveyor 154 in the desired direction. Preferably, conveyor 154 is driven, in any convenient manner by a reversible motor (not shown). In the illustrative embodiment of the invention the conveyor is driven so that its uppermost flight moves towards the left in FIG. 3 so that the stack is transported onto the lower conveyor 14a which in turn carries the stack to the selected gravity roller conveyor 22, in the manner described hereinafter.

UNSTACKER

As mentioned the stack of pans 38 formed in the stacker is supplied to any one of the selected roller gravity conveyors 22 by the use of the storage dolly 24. On the other hand, when it is desired to obtain a stack of pans to be supplied to the baking process, the retriever dolly 27 is utilized to obtain a stack of pans from a selected gravity roller conveyor 22, place them on conveyor 26, and supply the same to the unstacker 28. The latter is of substantially similar construction to the stacker 16 previously described in that it includes a frame 33 in which a lower conveyor 154 is mounted. That conveyor is located to be in alignment with conveyors 26a and 32, in the manner illustrated in FIG. 5. In addition, the stacker includes a pair of vertically extending frame members 56 on which are mounted a pair of drive chains 34 having stack support lugs 36. The physical construction of stacker frame 33, the drive for chains 34, and the manner of adjusting the distance therebetween is identical to that of stacker unit 16. Thus, the corresponding elements in the stacker and unstacker units have the same legend numbers applied thereto and need not be described in detail.

Figure 5:
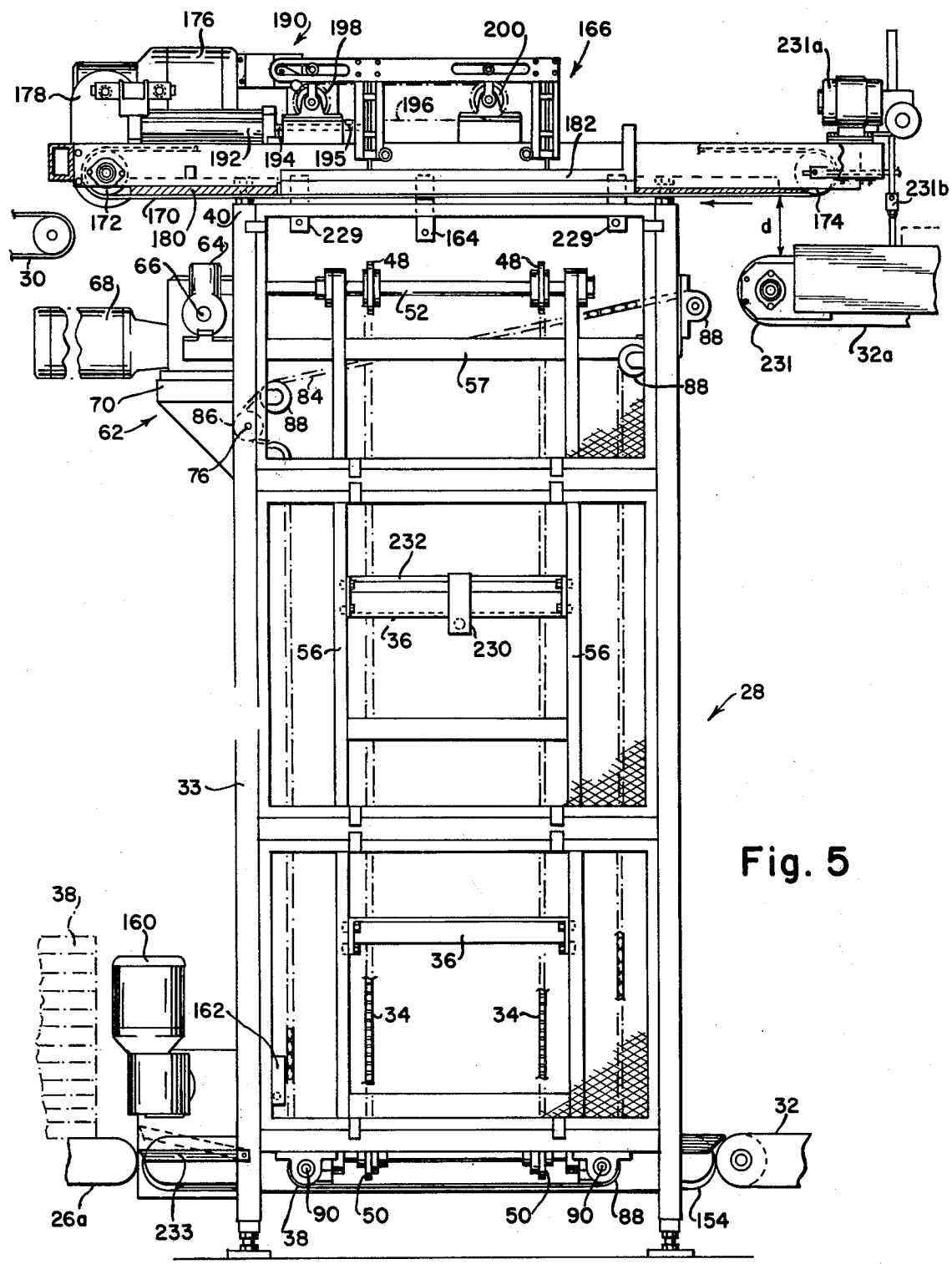
FIG. 5 is a side elevational view, along line 5—5, of the unstacker assembly shown in FIG. 4.

When a stack of pans 38 is supplied to the unstacker 28 upon a demand, as more fully described hereinafter, the stack travels along conveyors 26 and 26a, from retriever dolly 27, onto the conveyor 154 of the unstacker. The latter is driven by a motor 160 so that its uppermost flight moves to the left, as seen in FIG. 5. A photocell and reflector assembly 162 is provided adjacent the lowermost portion of frame 32 to determine the presence of a stack. This photocell arrangement is adapted to control motor 160, in any convenient manner, so that when a stack moves onto conveyor 154 it is sensed by the photocell and stops motor 160, after the stack clears the photocell, with the stack supported on the conveyor 154 between chains 34. Simultaneously, motor 68 is operated to drive chains 34, with their innermost flights moving upwardly, until a set of lugs 36 engages the lowermost pan 38 in the stack and raises the stack. Motor 68 continues to operate until the top of the stack is seen by the photocell assembly 164 mounted adjacent the top of frame 33. This photocell assembly, as with the previously described assemblies, includes a reflector on the opposite side of the frame from the photocell which reflects the light from the source therein to the photosensitive element within the photocell. When the top of the stack interrupts the reflected light beam from photocell 164, the stack is in position for unstacking and photocell 164 produces a control signal to stop motor 68. In this position the stack of pans is ready to be unstacked by the unstacking head 166 mounted at the top of frame 33.

Pickup head 166 is similar in construction to the previously described pusher head of the stacker, and is shown in greater detail in FIG. 6. The pickup head includes a frame 168 which is mounted on the upper end of frame 33 and has an endless conveyor 170 rotatably mounted thereon between rollers 172 and 174. Roller 172 is selectively driven by a motor 176 through a conventional transmission arrangement 178. A relatively large elongated magnet 180 is mounted in frame 168 between the flights of conveyor 170 so as to hold a bread pan against the conveyor in order to transport the pan out of the unstacker assembly, in the manner described hereinafter.

In order to remove individual pans from a stack supported on chains 34, pickup head assembly 166 includes a pair of reciprocally mounted frame members 182 on opposite sides of frame 168. Frame members 182 provide support for elongated bar magnets 184 mounted on the underside thereof. These frame members, with the magnets attached thereto, are adapted to be reciprocated towards and away from the stack supported on lugs 36 therebelow. On each reciprocation of the frame members an individual pan is removed from the stack and brought into contact with conveyor 170 and held thereby the magnet 180. Since conveyor 170 is driven by motor 176 so that its lowermost flight moves towards the left in FIG. 5, the conveyor transports the lifted pan onto conveyor 30 for distribution to the remainder of the bread manufacturing system.

Frames 182 are reciprocated by a drive mechanism 190 which includes a hydraulic ram 192 that is similar in construction and operation to the hydraulic ram 120 in the previously described stacker. That is, ram 190 includes an actuator rod 194 which is connected at 195 to an endless chain 196. The latter is trained about a pair of sprockets 198, 200, rotatably mounted on frame 168 and each having a pair of crank arms 202 rigidly secured to their respective axes of rotation on opposite sides of the sprockets (see FIG. 6a). The actuator rod 194 of ram 190 is connected to the chain 196 in a position such that upon extension of the actuator rod the sprockets 198 and 200 are driven through a full revolution.

The free ends 204 of cranks 202 are rotatably mounted in slots 206 formed in frame members 208. The latter are connected to each other to form a rigid frame by a cross-member 209 extending between them at the right ends thereof as seen in FIG. 6. By this construction, upon simultaneous rotation of cranks 198 and 200 frames 208 are moved downwardly in a relatively flat plane. The frames 208 are connected to frame members 182 by spring mounting arrangements 210, each of which includes a pair of support members 212, rigidly secured to its associated frame member 208, having a pair of guide members 214 secured thereto. Guide rods 216 are pivotally connected at one end to frame members 182 and slidably mounted within the guide members 214. These guide rods include stop members 218, of conventional construction, which prevent the rods from slipping out of guides 214 and each is surrounded by a coil spring 220 which serves to cushion upward movement of frame members 182 when they are engaged with a pan therebelow.

During the unstacking operation, when the stack of pans has reached the height determined by the location of photocell assembly 164, air is supplied to ram 192 in response to a signal produced by photocell 164, to extend the actuator rod 194 thereof. As mentioned, extension of actuator rod 194 causes chain 196 to rotate sprockets 198 and 200, through 360°; as a result, frames 208 are reciprocated in a vertical plane, thereby moving frames 182 downwardly into engagement with the uppermost pan in the stack. Because of the provision of slots 206 in frame 208, a dwell is provided in the movement of the frames when the ends 204 of cranks 202 are in their lowermost position. This delay keeps magnets 184 in contact with the topmost pan in the stack for a substantial period during reciprocation of frame 182 thereby assuring proper contact and attraction of the metal pans with the magnets. The spring mounting arrangement 210 permits magnets 184 and frames 182 to accommodate any irregularities or unevenness in the tops of the pans. It is noted that a pair of guide rollers 211 are mounted on each side of frame 168 in contact with vertical support members 212 to guide the vertical movement thereof and thus assure that frames 208 and 182 move in a vertical direction only.

Upon the completion of one revolution of sprockets 198 and 200, frames 208 are raised to their uppermost position, shown in FIG. 6, and the pan is lifted by magnets 184 and moved against conveyor 170. It is noted that the lowermost surface 222 of each magnet 184 is located to be above the level of conveyor 170, when frames 208 are in their raised position, as seen in FIG. 6a, so that as magnets 184 return to their uppermost position, they are pulled away from the pan 38 and the latter is held against conveyor 170. Since this conveyor has its lowermost flight driven to the left, as seen in FIG. 6, by 176, it moves the pan 38 towards the left and onto conveyor 30, as seen in FIG. 5.

It is noted that after the first pan has been lifted from the stack the actuator rod 194 of ram 190 is in its fully extended position. It is returned to its retracted position, shown in FIG. 6, upon the lifting of the next pan from the stack. This reciprocation of actuator rod 194 is controlled by a pilot valve 224, which corresponds to the pilot valve 122 previously described. Sprocket 198 includes a stub or tab 226 secured thereto for actuating a two-way switch 228, which corresponds to the switch 142 previously described, and operates to reverse the pilot valve 204. Accordingly, upon rotation of sprocket 198 in a counterclockwise direction during the first movement of actuator 194, the two-way switch 228 is actuated by tab 226 to reverse the position of the pilot valve in order to supply air to the double acting ram 194 to retract the actuator. When air is supplied to retract the actuator, the sprocket 198 is rotated in a clockwise direction, which causes tab 226 to move switch 228 to its second position, again reversing the position of pilot valve 224. In this manner, on each stroke of the ram 192, the sprockets 198 and 200 are rotated through 360° and the pilot valve which controls the direction of movement of the ram is automatically reversed.

The supply of air to ram 192 is also controlled by a pair of photocell assemblies 229 which operate in the same manner as the previously described photocell assemblies to determine whether the space below magnets 184 is clear. Thus, when a previously lifted pan is still in position below magnets 184 and begins to move to the left in FIG. 5, air to ram 192 is shut off because the light path of one or both of the photocells 229 will be interrupted by the pan. As soon as the pan passes the end of magnets 184, the photocells are cleared and they produce a signal permitting air to be supplied to ram 192 to drop the magnets into engagement with the next pan in the stack.

It is also noted that once a pan is lifted from the stack supported on lugs 36 below magnets 184 and raised therefrom, the pan passes the eye of photocell assembly 164 so that the light circuit of that photocell assembly is completed. As a result, that photocell produces a signal which actuates motor 68 to move drive chains 34 and lift the stack until the top most pan thereon interrupts the light path of photocell assembly 164. At that point motor 68 is stopped and the top most pan is in position to be engaged by the magnets 164 upon reciprocation of frames 208. This occurs, as mentioned, when photocells 229 are clear.

An additional photocell assembly 230 is mounted on frame 232 in a position such that its light path is above the level of conveyor 154 a distance equal to the normal height of stacks supplied to the unstacker. By this arrangement, the photocell determines when a sufficient clearance exists between lugs 36 and the conveyor 154 to permit another stack to be supplied to the conveyor; that is, when the entire stack has been lifted sufficiently (upon removal of pans from the stack) so that the lugs 36 which support it have been raised past the level of the light beam of photocell assembly 230, a new stack can be placed in the unstacker in preparation for further unstacking.

Photocell 230 also is adapted to produce a signal which controls a mechanical gate mechanism 233, of conventional construction, as would be apparent to those skilled in the art, which will prevent a stack of pans from passing onto conveyor 154 as long as the light beam of the photocell is blocked. When photocell 230 is clear, gate 233 will be lowered to permit the new stack to move from conveyor 26a onto conveyor 154. Alternatively, photocell 230 can be adapted to produce a signal which will control the retriever dolly described hereinafter, so that upon receipt of the proper signal from photocell assembly 230, the dolly will retrieve a stack of bread pans from the gravity roller conveyors 22 and supply the same along conveyor 26 to the unstacker.

When the new stack of pans moves onto conveyor 154, from conveyor 26a, the drive to the conveyor is stopped by photocell 162 after the end of the stack has passed its light beam, i.e. when the stack is in proper position between the chains 34, in the manner described above. It is noted that if it is desired to transmit a full stack from conveyor 26a to conveyor 32, i.e. through the unstacker and stacker back to the end 20 of gravity storage conveyors 22, photocell 162 can be manually overridden, in any convenient manner as would occur to those skilled in the art, to continue the drive of conveyor 154 and thereby permit the stack to pass directly through the unstacker to conveyor 32.

In addition, as mentioned above, by the construction of the present invention it is possible for individual bread pans to be passed directly through the stacker 16 to the unstacker 28 and through the unstacker back to the bread baking process. This is accomplished by the provision of the conveyor 32a located above conveyor 32. Preferably, the end 231 of conveyor 32a, seen in FIG. 5, is adjustable with respect to the frame 168 of the unstacker. For example, the conveyor end portion 231 can simply be pivotally mounted with respect to the remainder of the conveyor and connected to a lifting device or jack 231a which can raise or lower the conveyor end 231 with respect to frame 168, thereby to vary the space d therebetween. The jack 231a may simply be an electric motor mounted on frame 168 and connected through a right angle drive to a vertical support 231b and conveyor end 231. The adjustment of space d can then be made by operation of motor 231a to conform the height of that space to the height of the pan being transferred to the unstacker. Thus, an individual pan passing from the stacker assembly along the conveyor 32a will be moved into engagement with the conveyor 170 adjacent roller 174. At that point, the pan will come under the influence of magnet 180 and will be held against conveyor 170 for movement therewith to the opposite end of the unstacker, onto conveyor 30. In connection with this feature of the invention it is noted that the frames 182 each include an upright end portion 234 which will serve as a pan stop in the event that the pickup head is in its depressed position when a pan 38 enters the unstacker from conveyor 32a. This prevents interference of the individual pan with the reciprocating motion of the frame 182. Of course, in the raised position of the frame 182, a pan from conveyor 32a can pass directly beneath the frame without danger of the frame being reciprocated since the pan will break the light path of the photocell assembly 229, thus preventing air from being supplied to ram 192.

STORAGE DOLLY

Having thus described the stacker and unstacker, it will be understood that stacker 16 is adapted to form stacks of pans from the individual pans supplied thereto from conveyor 12. After a stack of predetermined height is formed, the stack is lowered onto the discharge conveyor 154 which moves the stack from the stacker 16 onto conveyor 14a and into a position adjacent the end 20 of one of the selected gravity roller conveyors 22, for placement thereon. The gravity roller conveyor 22 which is selected for placement of the stack is determined by a series of connected sensing devices on each of the gravity roller conveyors, as more fully described hereinafter, which provides a signal to the electronic control panel 108 indicating which stack in the series is filled and which is capable of receiving additional stacks. This signal is utilized to operate and control the storage dolly 24 which, as also described hereinafter, is then positioned adjacent the end 20 of the selected gravity roller conveyor 22 for placing the stack on the selected conveyor.

Figure 9:
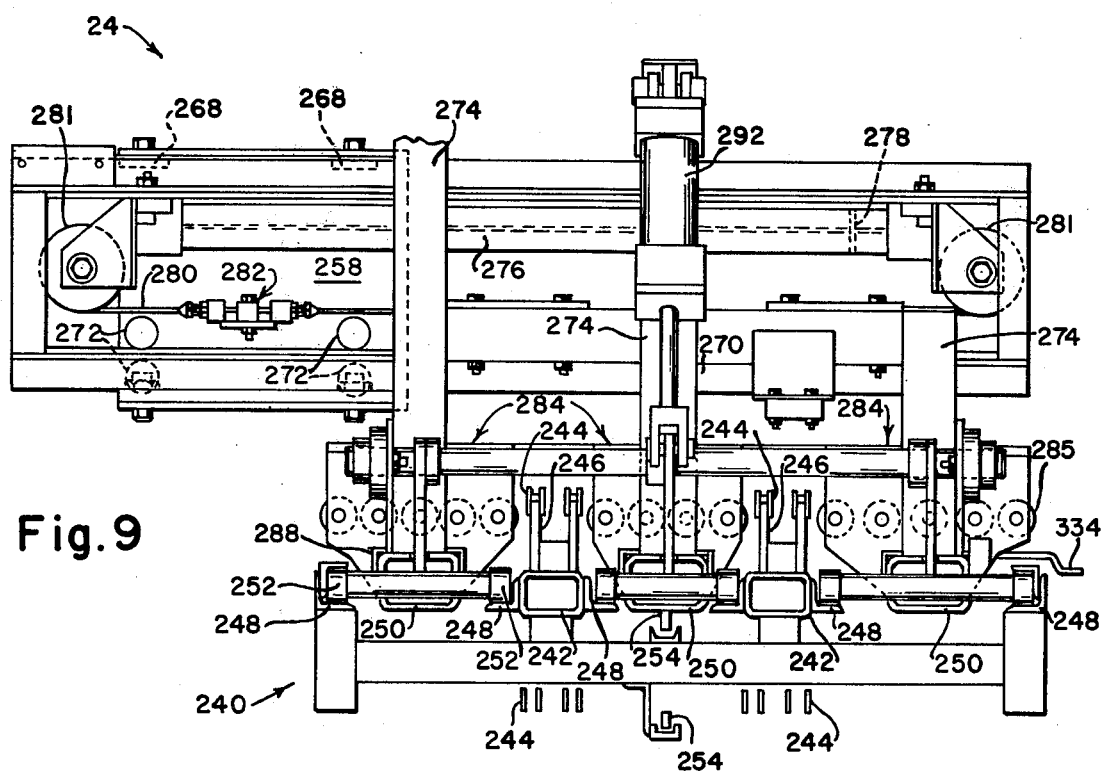
FIG. 9 is an end view, taken along line 9—9 of FIG. 8, of the pan stack storage dolly.

Storage dolly 24, most clearly illustrated in FIGS. 7-9 of the drawing, is mounted for movement along and with respect to conveyor 14. The latter, in the illustrative embodiment of the present invention, comprises an endless chain type conveyor having a longitudinally extending frame 240 and a plurality of longitudinally extending hollow tubular support members 242 mounted thereon. Two pairs of endless chains 244 are mounted for movement along conveyor 14 and form the moving portion thereof, with the chains sliding over associated vertically extending plates 246. Each of the chains 244 are trained about sprockets at opposite ends of frame 240, in any convenient manner, and they are driven by an electric motor or the like operatively connected to one of the sprockets. Further, the tubular support members 242 and frame 240 have a plurality of angle members 248 secured thereto, as illustrated most clearly in FIG. 9, on which dolly 24 is movably mounted.

As seen most clearly in FIG. 9, dolly 24 includes three rectangular tubular frame members 250 which are positioned between support members 242 and the ends of frame 240. A plurality of rollers 252 are rotatably mounted in frame members 250 and support the frames on angle members 248 so that the dolly is adapted to roll along conveyor 14 in the longitudinal direction, as indicated by the arrows A in FIGS. 1 and 8. Tubular members 250 are tied together by the superstructure of the storage dolly, as described more fully hereinafter. The centermost support tube 250 is secured to an endless chain 254 which is trained about frame 240 of conveyor 14, parallel to chains 244 and selectively driven by a reversible electric motor or the like (not shown) in order to move the dolly in the desired longitudinal direction. The motor driving chain 254 is controlled manually, or by signals from the gravity roller conveyors 22, to position the dolly adjacent the end of a selected gravity roller conveyor.

Storage dolly 24 also includes a pusher arm assembly 255 which has a main pusher arm 256 mounted at its inner end 258 on a rigid support structure 260 for lateral movement across and above conveyor 14, i.e. towards and away from the ends of the gravity roller conveyors. As seen in FIG. 8, rigid support structure 260 includes a pair of frame members 262 having angle members 264 secured to opposite sides thereof to define guide tracks 266 for rollers 268 secured to the end 258 of arm 256. Frame members 262 extend above and across conveyor 14 and the tubular frame members 250 of the dolly so that tracks 266 similarly extend across conveyor 14 towards the conveyors 20. One of the angle members 264 provides a lower, laterally extending flange 270 which is engaged between two pairs of rollers 272, rotatably mounted on the end 258 of arm 260. By this arrangement arm 256 is supported on frame 262 and movable with respect thereto across conveyor 14 towards conveyors 22.

Frame structure 262 is rigidly secured to three vertically extending frame members 274, respectively secured to tubular support members 250, thereby forming a completed integral storage dolly assembly. A double acting cable ram 276 is rigidly mounted in frame member 262, as seen in FIG. 9, and has a piston 278 therein which is connected to opposite ends of flexible cable 280. By supplying fluid, or air, to opposite sides of the ram 276 piston 278 will be moved in opposite directions thereby to move cable 280. The latter is trained over a pair of rollers 281, mounted in frame 262, and is secured by a connector 282, in any convenient manner, to the inner end 258 of arm 256. Accordingly, upon actuation of ram 276 the connector 282 is moved in the selected direction, thereby moving arm 256 in the same direction.

In addition to the above, storage dolly 24 also includes three sets of conveyor rollers 284. Each of these sets includes a pair of vertically extending end plates 286 between which rollers 285 are rotatably mounted. End plates 286 are secured to generally U-shaped channel members 288 which serve to rigidly interconnect the end plates 286 and thus form integral units. Channel members 288 are normally supported by their bight portions on tubes 250 and are vertically movable with respect thereto.

In the position of channel members 288 illustrated in FIG. 9 of the drawing, the rollers 285 in each set are located below the level of conveyor chains 244 so that a stack of pans seated on chains 244 can be moved thereby without interference from the rollers. Accordingly, as a stack of pans moves on conveyor chains 244 of conveyor 14, towards the selected gravity conveyor roller 22, the stack will approach the dolly and move into position over rollers 285. The stack then becomes engaged with, or hits, the left end plates 286, as seen in FIG. 8, and further movement of the pan by chains 244 is thus prevented. It is noted that the plates 286 at the right hand end of rollers 285, as seen in FIG. 8, are shorter than the left plates 286 so that their top edges are located at a level lower than the chains 244 and do not interfere with passage of the stack of pans onto the dolly.

As the pans move on chains 244 above rollers 285, towards the left end plates 286, the lowermost pan thereon engages the actuator 289 of an air limit valve 290, mounted on the center end plate 286, as seen in FIGS. 7 and 8. This limit valve serves to detect the presence of the stack of pans and is used to control the supply of air to a ram 292. The cylinder of ram 292 is pivotally connected at 294 to the center vertical support 274 of dolly 24. The actuator rod 296 of the ram is pivotally connected at 298 to a bell crank structure 300. The latter includes a first crank arm 302, to which the actuator 296 is connected and a rock shaft 304 which is rotatably mounted on the vertical frame members 274 above chains 244. Three crank arms 306 are rigidly secured to rock shaft 304 to complete the bell crank structure and are positioned to extend through slots 308 formed in the upper surface of support members 250. The free ends 310 of crank arms 306 are pivotally connected through a link 312 to a slide bar structure 314 (see FIG. 8a) located within each of the tubes 250. The bar structure 314 includes a pair of longitudinally extending bars connected to each other by two pairs of rollers 316 at opposite ends thereof. These rollers support members 314 in its associated tube 250 and permits it to be moved laterally within the tube upon rotation of shaft 304.

Each of the bar structures 314 also includes two cam rollers 318 which are adapted to cooperate with cam plates 320 secured to the lower surface of the U-shaped frame members 288 and extending into the interior of tubular members 250 through slots formed therein. By this construction, upon supply of air to ram 292, i.e. when valve 290 is actuated by the contact with a stack of pans, actuator rod 296 is retracted, causing clockwise rotation of rock shaft 304. This rotation of shaft 304 moves bar structure 314 to the left in FIG. 8, causing cam rollers 318 to engage the inclined surfaces 321 of cam plates 320 and thereby raise frame members 288. This vertical movement of frame members 288, of course, causes vertical movement of the end plates 286 secured thereto and the conveyor rollers 285 which are mounted thereon. In this connection, cam 320 is dimensioned so that upon full retraction of actuator rod 296, rollers 285 are lifted to a level above chain conveyors 244, thereby to engage the bottom of the lower pan in the stack and lift the stack off of the conveyor chains 244.

Upon complete retraction of actuator rod 296, air is automatically supplied, in sequence, to the right side of piston 278 in cylinder 276, as shown in FIG. 9, so as to cause the cable 280 to move in a counterclockwise direction, thereby moving the connection 282 between the cable and the arm 256 towards the right in that figure. Accordingly, arm 256 moves across the top of rollers 285 and thus engages its front face 322 with the stack of pans. Continued movement of arm 256 in this manner pushes the stack of pans along rollers 285 until the stack moves off the rollers onto the end of the associated gravity conveyor 22.

It is noted that the face 322 of arm 256 is at a slight angle with respect to the rollers 285, when viewed in plan. By this construction of the arm 256 the stack of pans on the rollers is positioned at an angle to the rollers so that the pans will rest on a greater number of rollers, across its diagonal, than it would if the pans were in longitudinal alignment with the rollers. This is an important feature of the invention since the more rollers the stack of pans is supported on, whether on the dolly or on the gravity roller conveyor 22, the smoother its movement will be as it rolls along these rollers.

The complete extent of movement of arm 256 is determined by an air limit valve 324 mounted on rigid frame 260, as seen in FIGS. 7 and 9. This valve is of conventional construction and includes an actuator stem 326 which is located to be engaged by an actuator roller or abutment 328 mounted on the inner end 258 of arm 256. Thus, when the arm has reached its full extent, i.e. towards the bottom portion of FIG. 7 in the drawing, abutment member 328 engages the actuator 326 of valve 324 and automatically reverses the flow of air to cylinder 276 to the opposite side of piston 278 thereby returning arm 256 to its original position. That position is limited by an additional air limit valve 330 having an actuator 332 which is positioned to be engaged by abutment member 328 upon return of the arm 256 to the position illustrated in FIG. 7. Thus, when abutment 328 engages actuator 332, valve 330 shuts off the supply of air to cylinder 276. Valve 330 also controls the supply of air to ram 292 and when actuator 332 is engaged, upon retraction of arm 256, the valve causes air to flow to the opposite side of the piston in cylinder 292, thereby to extend actuator 296 and lower the rollers 285 to their original position below chains 244. Of course, the rollers return to their position under the influence of gravity, after the cam rollers 318 are moved out of the way.

It is noted that the valve 330 is also connected, in any convenient manner, to the control system for operation of the drive chain 254 used to move dolly 24 from position to position. The valve acts as an override in the control system so that the chain 254 cannot be driven unless valve 330 is actuated by engagement of its actuator 332 with abutment 328. Thus, the dolly cannot be moved from its position once the arm 256 has begun its cycle of movement.

In operation, dolly 24 remains in a fixed position adjacent the end of one of the roller conveyors 22 until that conveyor becomes filled or until a different type of pan is sent to the dolly which must be stored in a different gravity roller conveyor, at which time the control system for the dolly is manually actuated to move it to the selected conveyor.

When the gravity roller conveyor which is adjacent the dolly is filled, the conveyor provides a signal, as described hereinafter, to the drive system for the dolly which causes the dolly to move to the next gravity roller conveyor. In this connection, dolly 24 includes an alignment tab 334 extending from the inner side thereof adjacent the ends of the gravity roller conveyors 22, (see FIG. 9) which is adapted to engage a contact switch at the end of the gravity conveyor rollers that controls the drive to the dolly. Thus, as soon as the tab 334 contacts with the microswitch adjacent the end of the next gravity roller conveyor 22, the drive to the dolly is stopped in alignment with the end of the conveyor and in position to begin storage of stacks of pans supplied thereto from stacker 16.

RETRIEVER DOLLY

When it is desired to remove individual stacks of pans from the storage conveyors 22, the pan retriever dolly 27 is utilized. That dolly is positioned for movement along the supply conveyor or infeed 26 which is of similar construction to the conveyor 14 previously described and includes two pairs of conveyor chains 244 mounted on and driven with respect to a frame 240 (see FIG. 12). The latter includes angle members 248 mounted thereon which provide rolling support for dolly 27.

Retriever dolly 27 is constructed in a manner similar to that of the storage dolly 24. Accordingly, like components therein have been referenced with the same reference numbers. More specifically, retriever dolly 27 includes a plurality of hollow tubular support members 250 which are positioned between the hollow tubular frame members 242 of frame 240. These frame members are mounted for movement along angles 248 by a plurality of pairs of wheels or rollers 252 secured thereto. Tubular members 250 each provide support for an inverted U-shaped member 288 having end brackets 286 rigidly secured thereto. A plurality of rollers 285 are rotatably mounted between the end brackets 286 and extend longitudinally with respect to the tube members 250 and parallel to chains 244. In addition, a vertically extending frame member 274 is secured to each of the tubular support members 250 to provide rigid support for the support frame 260 (which is of identical construction to the frame 260 previously described with respect to storage dolly 24.)

The dolly 27 is moved adjacent the ends of selected conveyors 22 by a drive chain arrangement 254 which is of similar construction to the drive chain arrangement of the storage dolly previously described. The chain is driven by an electric or pneumatic motor in any convenient manner and includes a manual override by which the operator can select the gravity roller conveyor from which the pans are to be retrieved. The frame of the dolly includes an outwardly extending tab 374 which is adapted to engage a microswitch at the end 24 of each of the storage dollys 22, which microswitches are located so that the tab 374 contacts the microswitch when the dolly is in proper alignment with the end of the gravity roller conveyor. The switch is adapted to automatically shut the power drive to chain 254 to stop the dolly. However, this switch can be overridden manually so as to move the dolly to another conveyor 22 as desired by the operator.

Each of the conveyors 22, as described hereinafter, also include sensing means which determines whether or not the conveyor has any stacks thereon to be supplied to the storage dolly. If no stacks are present on the dolly, the sensing device therein permits the dolly to continue moving to the next storage conveyor until a conveyor 22 is found which has stacks thereon. At that point, the sensing device in the conveyor having the stack causes the microswitch which is engaged by actuator 374 to stop the drive to the dolly. Thus, the device can be automatically operated to move the dolly to selected conveyors 22.

In order to withdraw a stack of pans from the selected conveyor 22, a retriever arm 340 is mounted on frame 260 by two pairs of rollers 342, engaged within the slots 266 formed in frame 260 between angles 264. An additional pair of rollers 344 engage the flange or edge 270 of one of the angles 264 so that the cantilevered arm 340 is mounted to the frame at three points and is supported thereon in a stable configuration for lateral movement with respect to frame 260 and across conveyor 26.

Figure 12:
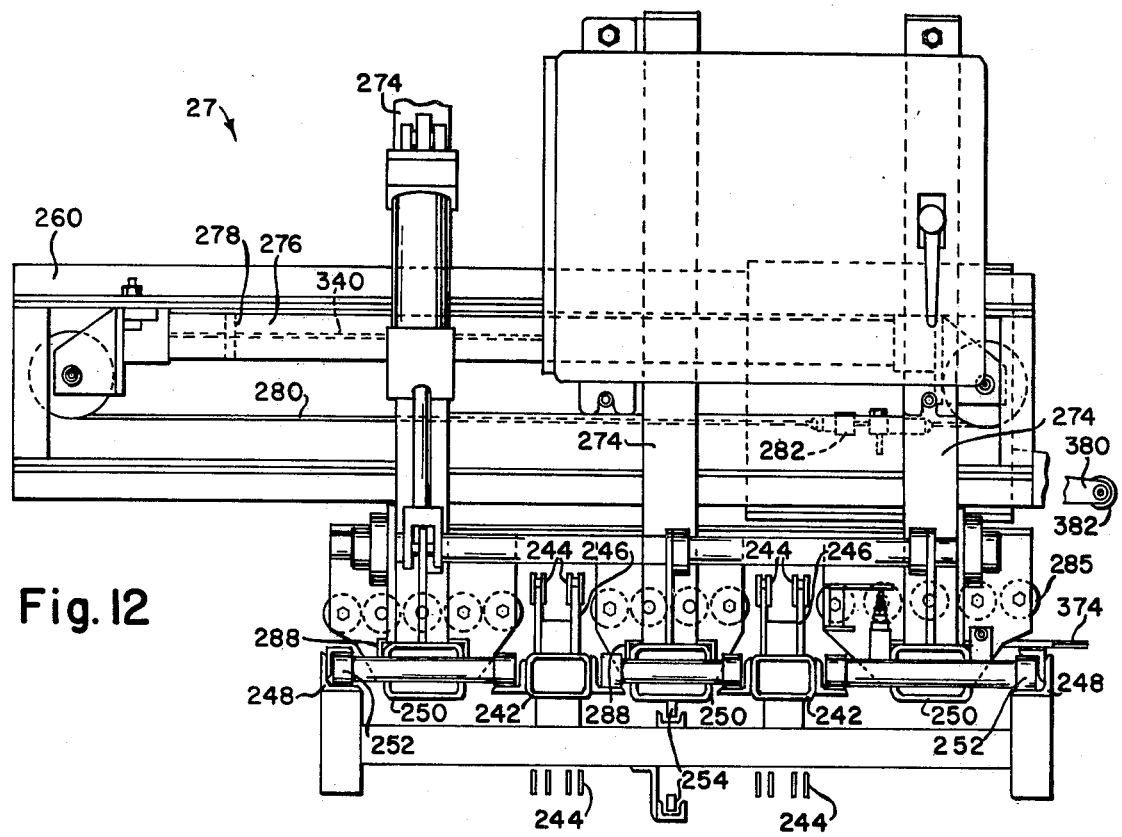
FIG. 12 is an end view of the retriever dolly, taken along line 12—12 of FIG. 11.

Arm 340 is moved across the conveyor 26 to obtain a stack of pans from an associated gravity roller storage conveyor 22 by the double acting pneumatic cable ram 276. As shown in FIG. 12 of the drawings, ram 276 is in its extended position with the arm 340 in its fully extended position adjacent the end 24 of its associated roller conveyor 20. Ram 276 includes a cable 280, secured at opposite ends to the piston 278 within the ram and secured, by a connection member 282, to the inner end portion 346 of arm 340. Accordingly, by supplying air to opposite sides of the piston 278 the cantilever arm 340 is moved across the top of conveyor 26.

Cantilevered arm 340 provides mounting support for a large magnetic head 348. That head includes a fixed outer magnetic portion 350 having opposite sides thereof impressed with opposite magnetic polarities S-N, as illustrated in FIG. 11. A central magnetic core 352 is rotatably mounted in the fixed frame 350 and has opposite sides thereof oppositely magnetically polarized and positioned so that, in the retracted position of the magnet, the N face of the rotary core is adjacent the S face of the fixed magnet portion and the S face of the rotary core is adjacent the N face of the fixed magnet. In this position of the rotary magnetic core the magnetic lines of flux pass directly from the rotary magnet to the fixed magnet and do not create any magnetic field outside of the face of the magnet.

Rotary magnetic head 352 includes a shaft 354 having a sprocket 356 integrally secured thereto. The latter is drivingly connected by a chain 358 to a sprocket 360 rotatably mounted on arm 340. Sprocket 360 includes a crank arm 362 which is operatively connected to a pneumatic ram 364 pivotally connected between a frame member 366 of arm 340 and the free end 368 of the crank. Ram 364 is used to initiate the sequence of operation of the retriever dolly to obtain a stack of pans from the conveyor 22 to which the dolly was previously moved.

The ram is actuated upon air being supplied thereto from a manually controlled valve in panel 108 or an automatic operation, through supply of air in response to a demand signal for more pans from the bread baking process, e.g. from the panner-moulder. In either case, the supply of air thereto extends actuator rod 370 and causes rotation of crank 362, thereby rotating sprocket 360 and rotary magnet 352. Ram 364 is located to rotate sprocket 360, and thus magnet 362, through approximately 180° so that the south polarity of the rotary magnet and fixed magnet thus are adjacent each other, as are the north polarities. This causes the magnetic lines of flux between the two polarities to extend across the face 372 of the magnet, thereby creating a magnetic field outside the magnet for attracting the metal pans to the magnet face.

As the crank 362 is rotated by ram 364, the crank becomes engaged with the actuator lever 376 of an air valve 378. The latter is operative to control the supply of air to the ram 276 which drives arm 340 back and forth across conveyor 26. Thus when valve 378 is closed, by actuation of lever 376, air is supplied to the right side of piston 276 (FIG. 12) in ram 274 so as to move the arm 340 and thus magnet assembly 348 towards the end of its associated gravity roller conveyor 22.

Valve 378 also operates to control a ram 292 in the retriever dolly. This ram, as seen in FIG. 11, is operatively engaged with a bell crank structure 300, which is of identical construction to the bell crank arrangement of the storage dolly previously described. This bell crank structure is operatively connected through a link 312 to three slide bar assemblies 314, each of which is movably mounted within an associated tubular support member 250 by the rollers 316. Each of the slide bar assemblies includes a pair of cam rollers 318 which are adapted to operatively engage the cam plates 320 which extend downwardly from frame members 288 into tubular support members 250. Thus, upon actuation of valve 378, actuator rod 296 of ram 292 is retracted so as to move slide 314 to the left in FIG. 11 and thereby raise rollers 285 above the level of the chains 244 of conveyor 26. In this position the rollers are in alignment with and lie in substantially the same plane as the rollers at the end 24 of gravity roller conveyor 22.

As ram 274 is extended to move the arm 340 towards its associated conveyor 22, an actuator probe arm 380, extending outwardly from arm 340, and having a roller 382 secured thereto, engages a release mechanism, more fully described hereinafter, associated with the gravity roller conveyor 22 to remove a stop at the end of the conveyor (also more fully described hereinafter) which normally prevents stacks from rolling off the end of the conveyor. Thus, in the fully extended position of arm 340, magnet head 348 is positioned adjacent the first stack of pans on the associated gravity roller conveyor 22 and this stack is magnetically attracted and attached to the magnetic head assembly 348. In connection with this feature of the invention, arm 340 has a plurality of outwardly extending frame members 384 which form an abutment surface extending parallel to the face 372 of the magnet head to engage the surface of the pan stack and hold the stack in a relatively stable condition, preventing pivoting about the contact with face 372, as the pan stack is retracted.

When arm 340 reaches its outermost position, adjacent the end 24 of its associated gravity roller conveyor 22, an abutment member or switch actuator 386 mounted on the inner end 346 of arm 340 engages the actuator member 388 of an air limit valve 390. The latter controls the supply of air to ram 276 and, upon actuation by contact with abutment 386, causes the supply of air to the ram to be reversed. Thus, air is supplied to the left of piston 278 within the ram, causing arm 340 to move back towards its original position with the stack of pans magnetically attached to the face 372 of the magnet head. The lowermost pan of the stack thus rides on rollers 285 of the dolly assembly, above the conveyor chains 244 until the arm 340 reaches its rearmost position.

Since the bread pans which may be used in conjunction with the pan handling assembly of the present invention may have various dimensions or widths, the pan retriever assembly is provided with a control system which is adapted to stop movement of arm 340 when the pans in the stack are substantially centered over the conveyor chains 244 of conveyor 26. This control system includes a first control or air limit valve 392 located adjacent the innermost roller 285a of the first group of rollers on the dolly. Roller 285a is mounted at its inner end 393 in a slot in its associated support frame 286 and is spring biased towards the top of the slot by a spring assembly 394 of conventional construction. Of course, the opposite end of roller 285a is loosely mounted in its associated plate 286 to permit the vertical movement of the end 393 thereof.

An actuator plate 396 is operatively connected to the shaft of roller 285a for vertical movement therewith and that actuator is connected to the plunger actuator member 398 of valve 392. By this construction, roller 285a is adapted to sense the presence of a stack of pans thereon and the weight of the pans presses the rollers against the spring 394 to open valve 392.

Valve 392 is used in a circuit for cooperation with a pair of air limit valves 400, 402, seen most clearly in FIG. 10, in order to control the return movement of arm 340 as follows: As arm 340 moves backwardly with the stack of pans, roller 285a is depressed by the leading edge of the stack of pans, thereby depressing actuator 398 and opening valve 392. As the arm 340 continues to move rearwardly, an elongated cam plate 399 (386) extending laterally from the inner end 346 of arm 340, ultimately engages the actuator 404 of valve 400 to open that valve. The specific pneumatic control circuitry provided will be understood by those skilled in the art, and is such that if valve 392 is still held open by the weight of its stack of pans on roller 285a when valve 400 is opened, the supply of air to ram 276 continues so that the arm 340 continues to move towards its rearmost position, illustrated in FIG. 10. During this movement plate 399 remains in contact with actuator 404 thereby keeping valve 400 opened. Accordingly, valves 392 and 400, when simultaneously open in this manner determine that the width of the pan stack selected is greater than the distance between valves 392 and 400 so that the arms can continue to safely move backwardly without danger of pulling the stack of pans off the rear end 406 of the dolly. On the other hand, if as arm 340 moves backwardly, valve 400 is opened by abutment engaging plate 399, and if valve 392 is closed, because the trailing edge of the stack of the pans has moved off of roller 285a, then the supply of air to ram 276 is stopped. This assures that the stack of pans, having a width less than the distance between valves 392 and 400, will be positioned over chains 244 and will not be pulled off the rear 406 of the dolly assembly.

As mentioned, when valves 392 and 400 are simultaneously opened ram 276 continues to operate to move arm 340 back to the position shown in FIG. 10. Ultimately, the arm enters that position and cam plate 399 engages the actuator member 408 of valve 402. The latter valve is a master control valve and will automatically stop the supply of air to ram 276 since the limit of movement of arm 240 is reached. Accordingly, it is seen that should the trailing edge of the stack of pans move off of roller 285a at any point in the path of travel of arm 340, between valves 400 and 402, the drive to the ram 276 is automatically stopped, assuring that the stack of pans will be supported on both sets of chains 244. In any case, the drive is stopped when valve 402 is reached.

Whenever the drive to arm 340 is stopped, either by the action of valves 392 and 400 or by valve 402, air is simultaneously supplied to ram 292 in order to rotate bell crank assembly 300 in a counterclockwise direction so as to slide member 314 to the right. This permits rollers 285 to move downwardly under the weight of the pans and in the influence of gravity to a position below chains 244. As a result, the stack of pans is supported on chains 244, which are moving to the right as indicated in FIG. 10 (the left in FIG. 1) so that the pans are moved by the chains to unstacker 28, previously described. In addition, air is also supplied to ram 364 to retract its actuator 370 and return the magnet assembly 348 to the position shown in FIG. 10 wherein the magnetic field at the face of the magnet is eliminated so that the stack is free to move on the conveyor chains 244.

Once the stack of pans clears the dolly assembly and begins to move towards the unstacker, the retriever dolly is in condition to operate to retrieve another stack of pans if the appropriate signal is provided to supply air to ram 364. Thereafter, the cycle of operation of the dolly repeats as described above.

STORAGE CONVEYORS

The gravity roller storage conveyors 22, upon which the stacks of pans are stored, are illustrated most clearly in FIGS. 13–18. The total area occupied by gravity roller storage conveyors or lanes 22 is determined by the number of pans required by a complete production cycle that originates with the moulder-panner and also ends there. For example, let us assume that the bakery uses both open top pans, strapped into a six pan strap measuring $9\frac{5}{8}$ by $35\frac{1}{4}$ inches and a Pullman pan also in a six pan strap measuring $13\frac{1}{2}$ by $35\frac{1}{4}$ inches. Let us further assume that the aim is an hourly production of 8,400 loaves of the open top bread and some 7,500 loaves of the Pullman type bread. These respective production volumes can be achieved if the complete pan cycle through the proofer, oven and pan return is held to 85 minutes, i.e. a rate of 23.3 straps of open top pans or 25.9 straps of Pullman pans per minute. Thus, with the first type of pan a total of 1,980 straps are required for a continuous cycle. If an extra 120 straps are added as a reserve, the total pans in storage will amount to 2,100 straps. Since these pans can be stacked 34 straps high, they will result in 62 stacks, which, with their individual widths of $9\frac{5}{8}$ inches, will require 50 feet of 36 inch wide gravity roller conveyors for storage. In the case of the Pullman pans, to produce 7,500 loaves per hour requires a rate of 21 straps per minute or a total of 1,780 straps for a complete pan cycle. By adding 120 straps for reserve, the final number becomes 1,900 straps. Since Pullman pans can stack only 22 straps high, calculation shows that their storage conveyor length amounts to 97 feet. Adding both of these storage conveyor lengths together yields 147 feet which, when divided into six lengths of rows, results in an individual row length of approximately 25 feet. Accordingly, it is seen that the number of storage conveyors which are provided can be accurately calculated by the volume of production required from the baking process which the pan handling apparatus of the present invention is to service.

The storage conveyors used in the present invention are of relatively simple construction and generally comprise a peripheral frame 410 which is supported by adjustable legs 412 at opposite ends thereof, in an inclined configuration with the higher end portion 20 of the storage conveyor located adjacent conveyor 14 and in position for cooperation with the storage dolly 24 and the lower end portion 25 located adjacent conveyor 26 for cooperation with the pan retriever dolly 27. A plurality of freely rotatable rollers 414 are mounted in frame 410 and extend transversely of the longitudinal axis of the frame. By this construction a stack of pans placed on the end 20 of a conveyor 22 will move freely, under the influence of gravity, to the lower end 24 of the conveyor.

As previously mentioned, because of the construction of the face 322 of the pusher arm 256 in storage dolly 24, the stacks of pans are placed on the conveyor by the storage dolly at a slight angle to the longitudinal axis thereof, as illustrated in dotted lines in FIG. 13. In this manner, the stack of pans 38 will rest on a larger number of rollers than it would if the pan were squared with the conveyor. Accordingly, the pans ride smoothly over the rollers and in a more stable condition.

One of the rollers, 414a, adjacent the end 20 of each of the gravity roller storage conveyors 22 is mounted for rotation and for limited vertical movement. The shaft 418 of that roller is operatively connected to the actuator 420 of a microswitch 422 and is biased into its uppermost position by a conventional spring mechanism 424 between the shaft and the actuator. By this construction, roller 414a is adapted to determine whether its lane or associated storage conveyor 22 is full and thus prevent a new stack of pans from being placed on the conveyor. That is, as soon as a stack of pans is supplied to the storage conveyor 22 roller 414a is depressed, actuating switch 422. This switch is a master switch which prevents the actuation of the storage dolly to supply another stack to the conveyor for a predetermined time period sufficient to permit the stack of pans to move down to the end of the conveyor and stop. In addition, the switch is provided with a time delay so that if the switch does not open after a predetermined period of time (because the weight of a stack seated on roller 414 keeps it closed) a signal is sent to the control panel of the device indicating that storage conveyor 22 is filled and actuating the storage dolly drive mechanism to move the dolly to the next empty storage lane.

Conveyors 22 also include an additional microswitch assembly 426 adjacent its free end 20. This switch cooperates with the tab 334 on storage dolly 24 and is actuated thereby to stop the drive of the dolly when the dolly is in alignment with the conveyor 22. A similar switch assembly 428 is located at the lower end 25 of conveyors 22 for cooperation with the actuator tab 374 of retriever dolly 27 for the same purpose.

The construction of switch 426 is identical to that of switch 428 and the latter is illustrated in FIG. 17. The switch assembly simply comprises a conventional microswitch 430 having a spring biased actuator or push button member 432 which extends into a guide track 434 defined between a pair of flanges 436,438. The latter serve to guide the actuator tabs of the respective dollys as they enter the forward end 440 of the guide track. As soon as the tab engages the microswitch actuator 432 the switch 430 is actuated and produces a signal which is used to stop the drive to the dolly. As will be appreciated from the plan view of the conveyors in FIGS. 1 and 13, the switches 426 and 428 are located with respect to the tabs on the dollys 24 and 27 so that the switches are engaged when the dollys are in alignment with the ends of the conveyor.

Each of the conveyors 22 is provided with a brake assembly 442 adjacent the lower end 24 of the conveyor. This brake assembly is operative to slow the first stack placed on the conveyor and to permit it to gently move towards the end of the conveyor. In the illustrative embodiment of the invention the brake assembly cooperates with a set 444 of rollers 414 and includes a generally inverted U-shaped frame member 446 (see FIG. 15) which has its bight portion 448 located in contact with the rollers in set 444. The underside of bight portion 448 is engaged by a pair of cam rollers 450 respectively mounted on bell cranks 452. The latter are pivotally mounted at pivot points 456 on a transverse support member 454, secured to frame 410 and are connected to each other through an air cylinder on ram 458.

Brake member 446 is biased downwardly, away from rollers 444 by two pairs of spring biasing mechanisms 460 which include a rigid bolt or the like connected between plates 462, secured to brake member 446, and the transverse frame members 454. Coil springs 466 surround and respective stem of bolts 460, below frame members 454 and operate between these frame members and nuts 468 to bias the brake downwardly away from rollers 444.

Ram 458 is normally in its extended configuration, with its actuator 470 extending out of the cylinder portion of the ram so as to bias bell crank 452 in rotation in the direction of the arrows placed thereon in the drawings, thereby to normally urge brake member 446 upwardly against the rollers 444 and thus frictionally resist rotation of these rollers. In this connection, it is noted that, by the respective mounting of the bell cranks 452 as seen in FIG. 2, less pressure is applied by the bell crank 452 at the left of the assembly than the bell crank 452 at the right. This is due to the fact that the left hand bell crank is inclined at a greater angle with respect to brake 446 than is the right hand bell carnk. Accordingly, the brake applies an increasing frictional force to the rollers 444 in the direction of travel of the stack of pans towards the lower end of the conveyor. In this way the stack of pans, moving under the influence of gravity along the rollers 414, is gently braked to almost a complete stop by the brake assembly 442.

One of the rollers 414b in the group of rollers 444 is mounted for vertical movement in frame 410 and is connected to the actuator of an air limit valve 474. Roller 414b is biased into its upward position by a spring mechanism 476, of conventional construction connected between the roller and the actuator of the valve. The latter is connected into the pneumatic circuitry of the apparatus so that when the slowed stack of pans moves over roller 474, thereby depressing the roller against the action of spring mechanism 476, the valve 474 is opened to supply air to ram 458 on the opposite side of the piston contained therein in order to retract actuator 470, thereby permitting the brake to be moved downwardly out of engagement with rollers 444 by the spring mechanisms 466. This permits the stack to continue moving to the end 24 of the conveyor, rather than stopping the stack over the brake assembly.

In order to prevent the stack of pans from rolling off the end 24 of conveyor 22, each of the conveyors includes a stop assembly 480 mounted on frame 410 at the end of the conveyor. The stop assembly includes a generally U-shaped stop or abutment member 482 having the free ends of its legs 484 pivotally mounted on frame 410 at pivot points 486. The bight portion 488 of stop 482 extends across the end 24 of the conveyor and has substantial vertical height so as to engage the bottommost pan of the stack when it is in its raised position, in order to prevent the stack from moving off the end of the conveyor.

Stop 482 is raised and lowered by a control mechanism 490 which includes an actuator bar 492 pivotally mounted on frame 410 at 494. Bar 492 is a bell crank having a lever portion 496 which is operably connected to frame 410 by a spring 498 which biases the actuator bar 492 into the vertical position shown in FIG. 14. Actuator bar 492 is connected to U-shaped frame member 482 by an intermediate link 500 which is pivotally connected at 502 to one of the legs 484 of the U-shaped frame. The other end of link 500 is pivotally connected to arm 492 (see FIG. 18) through a pivot pin 503 which extends through an elongated slot 504 formed in link 500.

Arm 492 also include an abutment plate 506 adjacent its upper end which is positioned to cooperate with the extended actuator member 382 on the retriever dolly 27, described above. As mentioned, actuator 382 moves forward with the arm 340 of retriever dolly 27 and, as the latter approaches the end 24 of conveyor 22, the actuator abutment 382 engages abutment plate 506 on arm 498, as illustrated schematically in FIG. 14, and causes arm 492 to pivot in a counterclockwise direction. This rotational movement of arm 492 causes the pivot pin connection 503, between arm 492 and link 500, to move in a similar counterclockwise direction until the pin engages the lower end of slot 504. At that point, the end of the pin 500 moves in the same counterclockwise direction, with arm 492, causing pivot point 502 to move downwardly, thereby allowing frame 482 to pivot about pivot points 486 to lower enlarged bight portion 484 thereof below the level of rollers 414. As a result, the stack of pans at the end of the conveyor can be drawn therefrom by the retriever dolly.

It is noted that the lower end 25 of each of the conveyors 22 also includes a sensing mechanism 520 which determines whether its associated conveyor is empty, and a control device for the brake assembly 442 to permit a subsequent stack in the conveyor lane to be moved to the end of the conveyor after the first stack thereon is withdrawn. The sensing mechanism 520 includes a microswitch 522 and an air limit valve 524 mounted on frame 410 adjacent the second roller 414c from the end of the conveyor. The shaft 526 of the roller is connected by a bracket 528 to the actuator stems 530, 532 of the microswitch and valve and the bracket 528 is biased in a vertical direction by a spring 534 acting between the bracket and a mounting plate 536 on frame 410. In this manner, roller 414c is biased in a vertical direction in the loose mounting thereof in frame 410. Accordingly, when a stack of pans is seated on conveyor 22, adjacent the end thereof, roller 414c is depressed against the bias of spring 534 and thus actuate switch 522 to provide a signal to the electronic control panel of the device indicating that a stack of pans is available for retrieval by dolly 27. Thus, when dolly 27 is moved into position adjacent the end of the conveyor, activation of switch 428 by the dolly will cause the dolly to stop and permit the retrieval operation to commence.

On the other hand, when no stack of pans is present on roller 414c, after a time delay which permits subsequent pans to move onto the roller after the retrieval of the first pan, switch 522 is opened, because of the bias of spring 534, to provide a signal to a control panel indicating that the lane is empty. Thus the dolly 27 will move directly past the empty lane without stopping upon contact of its actuator with switch 428.

The air limit valve 524 connected to bracket 528 and roller 414c is constructed to control and override the supply of air to the ram 458 of brake assembly 442. As mentioned above, air is normally supplied to ram 458 to keep brake bar 446 in frictional engagement with rollers 444, except when valve 474 is actuated to release the brake and permit the stack to roll to the end of the conveyor upon the initial storate operation, i.e. when the lane 22 selected for storage is empty. When the first stack moves passed the brake to the end of the conveyor, valve 524 is depressed and air is again supplied to ram 458 to actuate the brake. With valve 524 depressed, the next stack of pans moving onto the conveyor will be stopped by brake assembly 442 since valve 474 is controlled by valve 524 and will not open when valve 524 is actuated by the weight of a stack of pans on roller 414c. However, when the first stack of pans on the conveyor is removed by the retriever dolly 27, roller 414c moves upwardly under the bias of spring 534, as soon as the rear of the stack of pans clears the roller. This movement reverses valve 524 and causes air to be supplied to ram 458 to release brake assembly 442 and permit the next stack of pans, supported on the brake, to roll to the end of the conveyor.

By the time this next stack of pans approaches roller 414c, the stop member 428 has returned to its position shown in FIG. 14 under the influence of spring 498. That is, the spring rotates arm 492 in a clockwise direction causing the pivot point 502 to move in a counterclockwise direction, from its downward position, to raise the U-shaped frame assembly 482. Accordingly, as the next stack moves towards the end of the conveyor, it rolls over roller 414a, again reversing the operation of valve 524 and causing air to be supplied to the ram 458 to engage brake plate 446 with rollers 444, thus braking and stopping the subsequent stack of pans on the conveyor.

OPERATION

Accordingly, it is seen that a relatively convenient and inexpensive pan handling apparatus is provided which is adapted to automatically stack and unstack pans in a bread manufacturing process. Preferably, the pan handling system of the present invention is adapted to be interlocked with a panner-moulder of a bread pan manufacturing process.

As is apparent from the above description, an important feature of the pan handling system of the present invention is the automatic and mechanized handling of the pans. This arrangement offers a number of important advantages, principally among which are labor savings and absence of physical abuse of the pan material. Pan requirements for a given production run are determined by the production supervisor who sets the appropriate counters on a control panel 108 which will supply a control signal representing that bread pans are required and initiating movement of retriever dolly 27 to selected storage conveyor 22 having pans thereon and actuating the unstacker to unstack the pans.

Accordingly, a constant backlog of pans is supplied to the molder panner unit. After a sufficient number of pans is introduced into the production line, the pans begin to recycle, and an electronic device situated on conveyor 12, ahead of the unstacker, will provide a signal that will stop the unstacker and permit the pans to move through the top of the unstacker and stacker in the manner described above, once the recycling pans begin to pass this point. However, when a gap in the pan supply develops, the unstacker is again activated to supply additional pans to the bread manufacturing process. At the end of the production, or when a new bread variety is to be starged, the pans are automatically taken out of production and placed into storage. No manual handling of the pans is involved in either operation.

Thus, for example, at the beginning of the bread manufacturing process, the operator sets the appropriate controls on panel 108 to reflect the required number of pans needed in the bread manufacturing process. This causes actuation of the drive mechanism for retriever dolly 27 and causes the dolly to move in either direction, as selected by the operator, to the first gravity roller storage conveyor 22 which has pans stored thereon, as automatically determined by the microswitch 522 on the ends 24 of the conveyor. If pans are present thereon the retriever dolly is automatically stopped in alignment with the end of the conveyor by the engagement of its actuator member 374 with the actuator 432 of the microswitch 430. Once in position, air is automatically supplied to ram 364 in the retriever dolly to initiate the cycle of operation described above which ultimately causes a stack of pans to be placed on the chain conveyors 244 of conveyor 26 for transport thereby to unstacker 27. At the unstacker the stack of pans is moved onto conveyor 154 and engaged by the lugs 36 of the vertical chain conveyor. This conveyor is operated to raise the stack to a position determined by photocell 164, below the pickup or unstacker head 166. The head is then operated, in the manner described above, to remove individual pans from the stack and place them on conveyor 30 for supply to the panner-moulder of the bread making process.

At the end of the bread manufacturing run, or during the manufacturing run when excess pans are being used, or when the type of pans to be used is to be changed, individual pans returning along conveyor 12 towards stacker 16 are stopped in the stacker by abutment members 44. The pans are held adjacent the unstacker head 46 by the magnet 94 against the conveyor 96. The head is then actuated to drop the individual pans onto lugs 36, or onto a partially formed stack of pans supported on the lugs 36. After an individual pan is positioned on the lugs 36, chains 34 are driven to lower the lugs a sufficient distance to permit another pan to be placed thereon. After a stack of the desired height is formed, as determined by photocell 150, the stack is lowered onto conveyor 154 and transferred from there to conveyor 14. The latter transports the stack of pans to storage dolly 24. The drive for dolly 24 is actuated by the operator or actuated automatically when the stacker begins its operation, to move the dolly in either direction, represented by the arrow A in the drawings, until it locates a conveyor 22 which is empty, as determined by the switch 422 at the ends of each of the conveyors. The dolly is then stopped by engagement of its actuator tab with switch 426 so that the dolly is stopped in alignment with the empty conveyor 22. The stack of pans then moves over the dolly on chains 244 and engages the abutment actuator 288 which, in the manner described above activates the dolly to lift rollers 285 and raise the stack of pans off of chains 244, and thence initiate actuation of the pusher arm 256 to push the stack of pans onto conveyor 22. From there, the stack of pans rolls down the conveyor 22 and is slowed by the brake mechanism 442. The latter, under the control of valve 452, permits the stack to move to the end of the conveyor if the conveyor is completely empty, or stops the stack completely if there is a stack already present at the end of the conveyor. The bread handling system continues to operate in this manner in response to signals from the panner-moulder assembly which determine whether more or less pans are required from the storage area.

By the present invention there is no manual handling of the pans involved in either the stacking or the unstacking operations. The use of the pneumatic power to operate the various pan handling devices insures gentle pan transfers and minimum wear of the pans. Also, by closely integrating the pan supply from the storage system of the present invention to the needs of the moulder-panner, damaging backups of pans are avoided on the one hand and production interruptions caused by gaps in the pan supply to the panner are minimized. The pan management of the bakery is thus placed on a rational basis that contributes to the efficient and economical operation of the entire plant.

It is noted that the specific pneumatic and electrical circuitry used in the apparatus of the present invention has not been described herein in detail. However, in view of the detailed description of the apparatus, its sequence of operation, and the various control valves and switches used to control the operation of the apparatus, the specific pneumatic and electronic circuitry utilized would be apparent to those skilled in the art. Accordingly, such circuitry need not be described in detail and may take many obvious forms.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A pan retriever dolly for transferring a stack of pans or the like from a stack storage conveyor to a stack conveyor, said dolly comprising stack-engaging means for operatively engaging a stack of pans on said storage conveyor and for moving said stack over and onto said stack conveyor, said stack-engaging means including a relatively rigid retriever arm mounted on said dolly for reciprocating movement across said stack conveyor, towards and away from said storage conveyor, a magnet mounted on said retriever arm, and means for selectively reciprocating said retriever arm across said stack conveyor; said dolly including pan support means vertically movably mounted on said storage dolly, means for raising and lowering said pan support means between positions above and below said stack conveyor, means for actuating said raising and lowering means to raise said pan support means as said retriever arm is moved towards said storage conveyor, and means on said retriever dolly for determining movement of said arm into a predetermined position adjacent said storage conveyor and for reversing said reciprocating means to return said arm towards a predetermined position remote from said storage conveyor, whereby the retrieved stack is supported above said stack conveyor, as said arm is moved away from said storage conveyor with a stack of pans magnetically secured to said arm.

2. A pan retriever dolly as defined in claim 1 including means for stopping said reciprocating means as it moves said stack of pans away from said storage conveyor when said stack of pans is substantially centered over said pan support means.

3. A pan retriever dolly as defined in claim 2 wherein said stopping means includes first detecting means for detecting the presence and absence of a stack of pans on a predetermined portion of said pan support means and second detecting means for detecting the return of said arm to its initial position remote from said storage conveyor, said first and second detecting means cooperating to stop said reciprocating means when said second detecting scans detects said arm and said first detecting means detects that a stack of pans has moved off of said predetermined portion of said pan support means.

4. A pan retriever dolly as defined in claim 3 wherein said pan support means comprises at least two sets of rollers respectively positioned on opposite sides of said stack conveyor.

* * * * *